US010733876B2

(12) United States Patent
Moura et al.

(10) Patent No.: US 10,733,876 B2
(45) Date of Patent: Aug. 4, 2020

(54) DEEP LEARNING METHODS FOR ESTIMATING DENSITY AND/OR FLOW OF OBJECTS, AND RELATED METHODS AND SOFTWARE

(71) Applicants: CARNEGIE MELLON UNIVERSITY, Pittsburgh, PA (US); INSTITUTO SUPERIOR TÉCNICO, Lisbon (PT)

(72) Inventors: José M. F. Moura, Pittsburgh, PA (US); João Paulo Costeira, Lisbon (PT); Shanghang Zhang, Pittsburgh, PA (US); Evgeny Toropov, Pittsburgh, PA (US)

(73) Assignees: CARNEGIE MELLON UNIVERSITY, Pittsburgh, PA (US); INSTITUTO SUPERIOR TÉCNICO, Lisbon (PT)

( * ) Notice: Subject to any disclaimer, the term of this patent is extended or adjusted under 35 U.S.C. 154(b) by 0 days.

(21) Appl. No.: 16/500,092

(22) PCT Filed: Apr. 5, 2018

(86) PCT No.: PCT/US2018/026341
§ 371 (c)(1),
(2) Date: Oct. 1, 2019

(87) PCT Pub. No.: WO2018/187632
PCT Pub. Date: Oct. 11, 2018

(65) Prior Publication Data
US 2020/0118423 A1  Apr. 16, 2020

Related U.S. Application Data

(60) Provisional application No. 62/601,953, filed on Apr. 5, 2017.

(51) Int. Cl.
*G06K 9/00* (2006.01)
*G08G 1/01* (2006.01)
(Continued)

(52) U.S. Cl.
CPC ....... *G08G 1/0116* (2013.01); *G06K 9/00785* (2013.01); *G06K 9/6228* (2013.01); *G06N 3/08* (2013.01); *G08G 1/04* (2013.01)

(58) Field of Classification Search
CPC combination set(s) only.
See application file for complete search history.

(56) References Cited

U.S. PATENT DOCUMENTS 5,778,332 A * 7/1998 Chang .................. G08G 1/0104
701/117
5,999,635 A * 12/1999 Higashikubo ...... G06K 9/00785
382/104
(Continued)

FOREIGN PATENT DOCUMENTS

DE  102005053461 B4  10/2007
WO     2016096226 A1   6/2016

OTHER PUBLICATIONS

Fouladgar, Scalable Deep Traffic Flow Neural Networks for Urban Traffic Congestion Prediction, Feb. 2017, IEEE (Year: 2017).*
(Continued)

*Primary Examiner* — Alex Kok S Liew
(74) *Attorney, Agent, or Firm* — Downs Rachlin Martin PLLC

(57) ABSTRACT

Methods and software utilizing artificial neural networks (ANNs) to estimate density and/or flow (speed) of objects in one or more scenes each captured in one or more images. In some embodiments, the ANNs and their training configured to provide reliable estimates despite one or more challenges that include but are not limited to, low-resolution images, low framerate image acquisition, high rates of object occlusions, large camera perspective, widely varying lighting conditions, and widely varying weather conditions. In some embodiments, fully convolutional networks (FCNs) are used in the ANNs. In some embodiments, a long short-term memory network (LSTM) is used with an FCN. In such embodiments, the LSTM can be connected to the FCN in a residual learning manner or in a direct connected manner.

(Continued)

Also disclosed are methods of generating training images for training an ANN-based estimating algorithm that make training of the estimating algorithm less costly.

32 Claims, 10 Drawing Sheets

(51) Int. Cl.
*G08G 1/04* (2006.01)
*G06N 3/08* (2006.01)
*G06K 9/62* (2006.01)

(56) References Cited

U.S. PATENT DOCUMENTS

| | | | |
|---|---|---|---|
| 6,188,778 B1 * | 2/2001 | Higashikubo | G08G 1/04 340/934 |
| 2012/0188102 A1 | 7/2012 | Kalyanaraman | |
| 2013/0136307 A1 | 5/2013 | Yu | |

OTHER PUBLICATIONS

International Search Report and Written Opinion dated Aug. 1, 2018, in connection with PCT/US2018/026341.

* cited by examiner

DEEP LEARNING METHODS FOR ESTIMATING DENSITY AND/OR FLOW OF OBJECTS, AND RELATED METHODS AND SOFTWARE

RELATED APPLICATION DATA

This application claims the benefit of priority of U.S. Provisional Patent Application Ser. No. 62/601,953, filed Apr. 5, 2017, and titled "Extract Urban Traffic Information From Citywide Infrastructure Sensors to Augment Autonomous Intelligent System," which is incorporated by reference herein in its entirety.

FIELD OF THE INVENTION

The present invention generally relates to the field of machine/computer vision. In particular, the present invention is directed to deep learning methods for estimating density and/or flow of objects using machine vision, and related methods and software.

BACKGROUND

With increasing instrumentation and increasing automation in public sectors come ever increasing amounts of data and the desire to use that data for uses such as improving automation and, more generally, increasing realtime awareness of information that can be useful for decision-makers. For example, cities are becoming increasingly instrumented with a variety of sensors, such as magnetic loop detectors, infra-red sensors, pressure pads, roadside radar, and web cameras. Many of these sensors can provide relevant information regarding traffic flows in the city, like vehicle speed, count, and types. In particular, the increasing availability of video cameras installed at intersections of urban streets or other roads in the city, allows for the extraction of realtime estimations of traffic flows per type of vehicle, such as the flow rate of yellow cabs. The citywide web cameras capture traffic video twenty four/seven, continuously, generating large-scale traffic video data. These cameras either are low quality, or it may be the intent to only process low quality versions of their video. This precludes most existing techniques for traffic flow analysis.

It is expected that driverless vehicles will increasingly populate city streets and become a significant fraction of traffic flows in the near future. While driverless-vehicle sensing provides awareness about the local conditions where it operates, infrastructure sensors, increasingly available with the emergence of the Internet of things, have the potential to provide global awareness for driverless cars of traffic conditions across an entire city or other area. Much effort has been on processing sensing data collected by the driverless car's suite of sensors. However, much less work exists on processing simultaneously streaming video from city traffic cameras to build a multi-model autonomous system. Indeed, problems inherent in typical traffic cameras, such as low framerate and low resolution, along with problems inherent in the nature of vehicle traffic, such as varying weather conditions, daily changing lighting conditions, and wide variety of vehicle types and models, make using information from such cameras in any meaningful way extremely challenging.

SUMMARY OF THE DISCLOSURE

In one implementation, the present disclosure is directed to a method of providing traffic density and/or traffic flow data to an intelligent traffic system, wherein the traffic density and/or traffic flow data is for a plurality of regions of a roadway network, each region having associated therewith a traffic camera that captures at least one corresponding traffic image of the corresponding region. The method includes automatically estimating, locally to each traffic camera, traffic density and/or traffic flow in the corresponding region of the roadway network using the at least one corresponding traffic image, the estimating for each corresponding region comprising: training an artificial neural network (ANN)-based density estimation algorithm using training annotated images, wherein the ANN-based density estimation algorithm is configured, when trained, to process one or more input images to automatically determine a traffic density and/or traffic flow for traffic present in the input image(s); receiving the at least one corresponding traffic image; and following the training of the ANN-based density estimation algorithm, causing the ANN-based density estimation algorithm to process the at least one corresponding traffic image to determine the traffic density and/or traffic flow for the corresponding region; and transmitting from local to each traffic camera to the intelligent traffic system traffic density and/or traffic flow data corresponding to the traffic density and/or the traffic flow in the corresponding region of the roadway network.

In another implementation, the present disclosure is directed to a method of generating a set of training images for an artificial neural network (ANN)-based density estimation algorithm, wherein the ANN-based density estimation algorithm is used to detect density of objects of one or more target types within a scene captured by a fixed camera. The method includes receiving a first set of real images captured by the fixed camera, wherein each real image includes at least one real object having a type within the target types; processing each real image using an ANN-based detector so as to annotate occurrences of objects of the one or more target types within each real image with corresponding respective first bounding-box regions, wherein the processing results in a set of annotated real images; and processing each annotated real image using an ANN-based segmentator so as to generate a corresponding pixel-wise background mask, which is further used to generate a density map for training.

In still another implementation, the present disclosure is directed to a method of estimating density of objects of differing target types in images of a scene captured by a camera. The method includes receiving a training dataset, wherein the training dataset includes a plurality of synthetic images having a training perspective substantially the same as the camera perspective of the camera, each of the synthetic images containing a plurality of rendered objects of differing types, wherein the rendered objects: are based on 3D CAD models of differing objects of the differing types; have been placed in the synthetic image using realistic perspectives and realistic occlusions based on the camera perspective; and are automatically labeled for categorization based on the 3D CAD models; training an artificial neural network (ANN)-based density estimation algorithm using the synthetic images, wherein the ANN-based density estimation algorithm is configured, when trained, to process an input image to automatically estimate the density of objects of the differing target types present in the input image; receiving the images; and following the training of the ANN-based density estimation algorithm, processing each of the images using the ANN-based density estimation algorithm to estimate the density for the image.

In yet another implementation, the present disclosure is directed to a method of providing traffic density and/or traffic flow data to an intelligent traffic system, wherein the traffic density and/or traffic flow data is for a plurality of regions of a roadway network, each region having associated therewith a traffic camera that captures at least one corresponding traffic image of the corresponding region. The method includes receiving, at a centralized estimating system from each traffic camera, a corresponding low-resolution image corresponding to each of the at least one corresponding traffic images; automatically estimating, at the centralized estimating system, traffic density and/or traffic flow in the corresponding region of the roadway network using the corresponding low-resolution image(s), the estimating in each corresponding region comprising: training an artificial neural network (ANN)-based density estimation algorithm using training annotated images, wherein the ANN-based density estimation algorithm is configured, when trained, to process one or more input images to automatically determine a traffic density and/or traffic flow for traffic present in the input image(s); and following the training of the ANN-based density estimation algorithm, causing the ANN-based density estimation algorithm to process the corresponding low-resolution image(s) for each of the regions to determine the traffic density and/or traffic flow for the corresponding region; and transmitting, from the centralized estimating system to the intelligent traffic system, traffic density and/or traffic flow data corresponding to the traffic densities and/or the traffic flows for the regions of the roadway network.

In still yet another implementation, the present disclosure is directed to a method of determining an object count from an image acquired by a camera. The method being executed in a machine and including jointly estimating the object count and an object density using a fully convolutional network (FCN), wherein the jointly estimating includes using the FCN to map dense features within the image into the object density; using a residual learning framework, learning residual functions with reference to a sum of the object density in the image; combining appearance features from shallower layers of the FCN with semantic features from deep layers of the FCN to produce a denser feature map; and determining the object count using the denser feature map.

In a further implementation, the present disclosure is directed to a method of determining an object count from frames of a video acquired by a camera. The method being executed in a machine and including jointly estimating the object count and an object density using a fully convolutional network (FCN), wherein the jointly estimating includes using the FCN to create object density maps for the frames of the video; providing the object density maps to a long short-term memory (LSTM) network, wherein the LSTM network is configured to learn residual functions with reference to a sum of densities in each of the frames; and summing the residual functions and the densities to determine the object count.

In another implementation, the present disclosure is directed to a method of determining an object count from frames of a video acquired by a camera. The method being executed in a machine and including jointly estimating the object count and an object density using a fully convolutional network (FCN), wherein the jointly estimating includes using the FCN to create object density maps for the frames of the video; providing the object density maps to a long short-term memory (LSTM) network, wherein the LSTM network is configured to learn residual functions with reference to a sum of densities in each of the frames; and summing the residual functions and the densities to determine the object count.

In still another implementation, the present disclosure is directed to a method of determining object counts from images from across a plurality of cameras. The method includes receiving a set of labeled images from a plurality of source cameras within the plurality of cameras; receiving a set of unlabeled images from a plurality of target cameras within the plurality of cameras; extracting features from the labeled images and unlabeled using a feature extractor; classifying the extracted features into a certain source or target using a multi-domain classifier; estimating vehicle density using a density estimation branch; performing back-propagation-based training using a gradient reversal between the multi-domain classifier and the feature extractor; and following backpropagation-based training, determining the object counts from the images.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
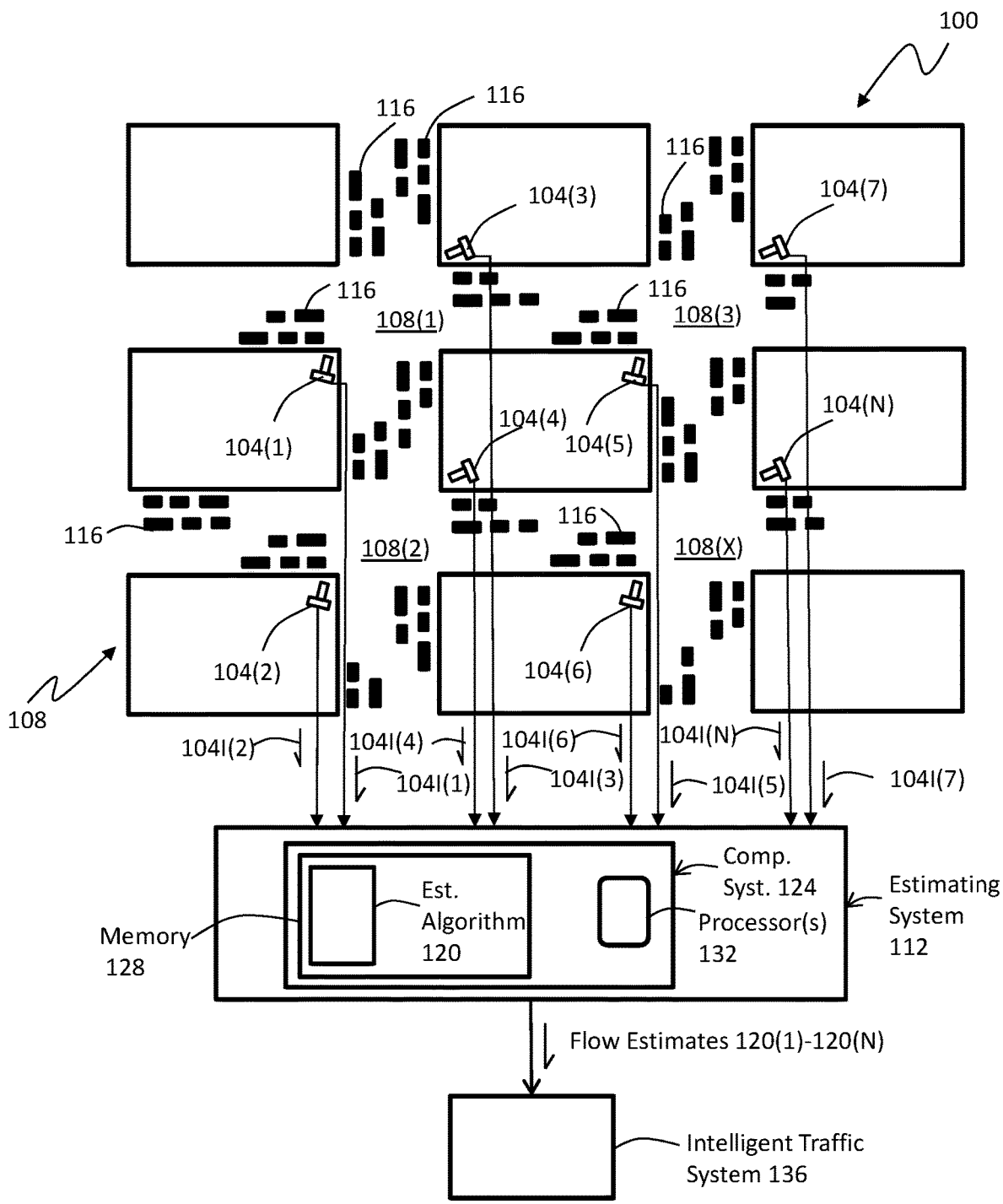
FIG. 1 is a high-level diagram of an example vehicular-traffic implementation of an artificial neural network (ANN)-based estimating system of the present disclosure that automatically estimates traffic density and/or traffic flow from images taken by one or more traffic cameras.

In some aspects, the present disclosure is directed to methods of estimating the density and/or flow of objects using machine vision. (As used herein, the term "and/or" when used as a conjunctive between two items means one of the items, the other of the items, or both of the items, depending on implementational choice.) Typically, the objects are visually varied in nature in any one or more of a variety of ways. For example, in a traffic context, the objects are vehicles that usually (unless restrictions such as "buses only" or "no trucks allowed" are in place) can be of virtually any type (e.g., passenger car, SUV, minivan, van, box truck, tractor-trailer, city bus, interstate bus, recreational vehicles, work truck, etc.) and can be virtually any manufacturer make and model, past or present. As another example, in a crowd context, the objects are typically humans that can be any gender, size, age, standing, sitting, facing in any direction, etc. These conditions alone and the low video quality make reliable object detection and any follow-on density and/or flow estimating challenging. And this is not to mention that, depending on the camera perspective(s) and the closeness of the objects to one another, partial occlusion of one or more of the objects by another of the objects further adds to the significant challenge. Techniques and methodologies disclosed herein can also overcome challenges due to object variability and allow for robust and reliable density and/or flow estimating.

Such estimating methods can be implemented outdoors, where weather conditions are ever changing, as are lighting conditions due to the daily and yearly cycles and changing weather conditions. For example, the estimating of the density and/or flow of traffic on a city street, intersection, or other location, can be greatly complicated by the varying visual characteristics of the scene(s) due to things such as shadows, glare, reflections (e.g., from wet surfaces), light intensity, etc., as viewed by the traffic camera(s). Similarly, the estimating of the density and/or flow of crowds in outdoor spaces can similarly be complicated by varying visual characteristics of the scene(s). Techniques and methodologies disclosed herein can overcome challenges due to lighting and/or weather conditions, depending on their presence, and allow for robust and reliable density and/or flow estimating.

Estimating methods of the present disclosure can be implemented using any suitable type of imaging device, such as a traffic camera, including a traffic camera having any one or more of a low resolution (e.g., 350×250 pixels or fewer) and a low framerate (e.g., 1 frame per second (FPS) or less). For example, cities are increasingly deploying traffic cameras at many locations throughout their networks of streets and roads, including at many intersections, known traffic bottlenecks, and along important traffic corridors, among others, and these traffic cameras are often both low resolution and have a low framerate or, if of higher quality, it is of interest to process only low resolution version of the video captured by the camera. Either and both of these characteristics can also complicate the ability to reasonably and usefully estimate the density and/or flow of objects. Techniques and methodologies disclosed herein can also overcome challenges due to camera characteristics and allow for robust and reliable density and/or flow estimating.

In some aspects, the present disclosure is directed to using estimated object density and/or flow to influence the behavior of an actor, which can be a machine-based system or a human. In the vehicle-traffic context, examples of how object-density and/or flow estimates can be used to influence the behavior of an actor abound. For example, a roadway network may include traffic-control infrastructure, such as traffic-control signals, that are controlled by a centralized or distributed controller system that is programmed to automatically control the traffic control signals. Here, the controller system can be programmed to use the traffic-density and/or flow estimates to control individual ones or sets of the traffic control system in a manner that tends to improve the flow of traffic. As another example, the actor may be a self-driving car, which can be provided with a control system that is programmed to use the traffic-density and/or flow estimates to calculate an appropriate route that may tend to avoid congested areas of the roadway network in order to minimize travel time. As a further example, a self-driving car actor may choose to use the information provided by a surveillance camera about traffic in blind spots of the actor sensor system, such as around a corner. As yet another example, human drivers may have access to navigation devices (e.g., built into a vehicle or provided apart from the vehicle, such as a smartphone running a suitable app or an accessory global positioning system (GPS) navigation device, etc.) that are programmed to use the traffic-density and/or flow estimates in a useful way, such as by calculating routes as a function of such estimates and presenting those routes to the user or displaying density and/or flow information based on the estimates to a user, such as overlaid onto a map image displayed to the user. These are but a few examples of how the traffic-density and/or flow estimates can be used to control the behavior of an actor.

In this disclosure and in the claims appended hereto, the term "intelligent traffic system" is used to denote any machine-based system that utilizes traffic-density and/or flow estimates determined using a methodology disclosed herein for some purpose. For example, an intelligent traffic system can be a self-driving vehicle, a control system for a self-driving vehicle, a traffic-control infrastructure control system (centralized or distributed), a navigation device, and a realtime traffic display system, among others. Regarding a realtime traffic display system, this may be, for example, a mobile or stationary device or devices that electronically displays a map overlaid with traffic-density and/or flow information based on the estimates.

Also in this disclosure, the term "estimating system" is used to denote a system that automatically determines the object-density and/or flow estimates using a methodology disclosed herein. Such an estimating system may be composed of one or more computing devices (e.g., server, desktop computer, laptop computer, tablet computer, computing device aboard a camera, etc.) and one or more suitable communications systems, wired and/or wireless, for receiving image data and communicating estimates to any suitable user(s) of the estimates, such as one or more intelligent traffic systems. In some embodiments, the estimating system may include the imaging device(s) that generate the images used in the estimating methodologies disclosed herein. However, the estimating system may be considered to exclude such imaging device(s), for example, if the imaging device(s) are provided by another entity, such as a city, state, or other governmental or non-governmental entity. Those skilled in the art will readily understand the type(s) of computing devices, communications systems, and imaging devices that are suitable for use with the disclosed estimating systems and intelligent traffic systems, such that detailed descriptions of each are not necessary for those skilled in the art to understand the scope of the present invention.

It is noted that the following examples are directed to estimating characteristics of vehicular traffic, which is indeed a useful deployment of methodologies and systems of the present disclosure. However, it is noted that estimating vehicular-traffic characteristics is not the only use of these methodologies and systems, as the same or similar techniques can be used for other purposes, such as estimating characteristics of crowds of people, groups of animals, and groups of other inanimate, but moving, objects, and characteristics of movement of other objects. Those skilled in the art will readily understand how to adapt techniques and methodologies from these vehicle-based examples and apply them to other scenarios without undue experimentation. Indeed, aspects such as the "intelligent traffic system" can be modified to an "intelligent crowd system" or an "intelligent object-grouping system" as needed to suit a particular application.

It is also noted that the appended claims, as originally filed, are part of this disclosure as if they were present verbatim in this detailed description section.

Example Vehicular Traffic Implementation

With the foregoing in mind and referring now to the drawings, FIG. 1 illustrates an example vehicular-traffic implementation 100 of an ANN-based estimating system of the present disclosure in which a plurality of traffic cameras 104(1) to 104(N) are deployed at intersections 108(1) to 108(X) of a roadway network 108, which may be a network of streets within a city, for example. Each traffic camera 104(1) to 104(N) has a perspective relative to the corresponding intersection 108(1) to 108(X) and provides one or more images 104I(1) to 104I(N) (e.g., in the form of still images or video images) of a scene (not shown), which in this example is a scene unique to each traffic camera. In some embodiments, traffic cameras 104(1) to 104(N) may be all of the same type. For example, each traffic camera 104(1) to 104(N) may be a low-resolution camera, such as a camera having a resolution of less than 350×250 pixels. In addition or alternatively, each traffic camera 104(1) to 104(N) may have a low framerate, such as a framerate of less than 1 FPS. In some embodiments, each traffic camera may have a high resolution (e.g., 2000 pixels×1000 pixels or greater and/or a high framerate, such as 10 FPS or higher. In some embodiments, traffic cameras 104(1) to 104(N) may be of differing types. Fundamentally and unless noted otherwise, the resolutions and framerates of traffic cameras 104(1) to 104(N) can be any resolutions and framerates.

In one example, traffic cameras 104(1) to 104(N) are in communication with a centralized estimating system 112 that uses the one or more images 104I(1) to 104I(N) from each traffic cameras to determine estimates of the density and/or flow of vehicles 116 (only a few labeled for convenience) within the corresponding scene. In this connection, it is noted that the term "centralized" as used herein and in the appended claims does not mean that there is necessarily a single computer or other device performing the estimating, though that can be the case. Rather, in the context of roadway network 108 and corresponding plurality of traffic cameras 104(1) to 104(N) "centralized" means that the processing is performed remotely from the traffic cameras. Such processing can be performed in a single computing device or across a plurality of computing devices (e.g., web servers).

In some embodiments, it may be desirable to minimize the amount of data needed to be transmitted from traffic cameras 104(1) to 104(N). This can be accomplished, for example, by deploying traffic cameras having low-resolution and/or low framerates. However, this can also be accomplished by down-converting images 104I(1) to 104I(N) captured by traffic cameras 104(1) to 104(N) to a lower resolution than the as-captured resolution of the corresponding traffic camera(s) and transmitting the lower-resolution image(s) to centralized estimating system 112 and/or transmitting fewer than all images captured by each camera. As an example of the latter, if the particular traffic camera has a frame rate of 20 FPS, the camera, or other device in data communication therewith, may transmit only one of those images per second. As described herein, ANN-based estimating algorithms of the present disclosure are particularly suited for handling low-resolution images and/or low-framerate videos while still providing useful estimates.

As noted above, vehicles 116 may differ from one another and may be any of a variety of types, makes, models, etc. Those skilled in the art will readily understand that traffic cameras 104(1) to 104(N) may be in communication with estimating system 112 in any suitable wired or wireless manner known in the art.

Estimating system 112 includes one or more artificial neural network (ANN)-based estimation algorithms 120 (e.g., multiple algorithms in a distributed processing architecture) that perform the estimating using images 104I(1) to 104I(N) acquired by traffic cameras 104(1) to 104(N) to generate corresponding respective traffic density and/or flow estimates 120(1) to 120(N), depending on how the estimation algorithm(s) 120 is/are configured. Estimating algorithm(s) 120 may be any suitable ANN-based algorithm, such as an algorithm that includes one or more convolutional neural networks (CNNs). Examples of suitable ANN-based algorithms include, but are not limited to algorithms that include region-based CNNs (R-CNNs) (e.g., Fast-RCNN and Faster-RCNN) and/or fully convolutional networks (FCNs) (e.g., multitask learning FCN (FCN-MT), long short-term memory FCN with residual learning (FCN-rLSTM)), among others. Fundamentally, there is no limitation on the type(s) of ANN(s) used in estimating algorithm(s) 120 other than that it be robust enough and trainable to overcome the challenges of the difficult object-detection tasks that the estimating algorithm needs to perform to provide useful estimates. Generally, non-LSTM ANNs disclosed herein are suitable for estimating densities from single images, while LSTM-based ANNs, are particularly useful for estimating both densities and flows due to their ability to "remember" information from one frame to the next in a set of time-sequenced images. Detailed examples of ANN-based techniques that can be implemented in estimating algorithm(s) 120 are described below.

Each estimating algorithm 120 is suitably trained to detect different vehicles of differing types under differing lighting and weather conditions and differing vehicle placements. Example training methodologies, including synthetic-image-based and hybrid-image-based training, for training estimating algorithm(s) 120 are described below in detail.

Estimating system 112 may include a suitable computing system 124 that includes memory 128 that contains, among other things, estimating algorithm(s) 120, and one or more processors 132 that execute the estimating algorithm. As those skilled in the art will readily understand, memory 128 may be composed of any one or more types of memory, including nonvolatile and volatile memory, as well known in the art. Similarly, those skilled in the art will readily appreciate that the one or more processors 132 may be of any suitable type(s) (e.g., general purpose processor, field-programmable gate array, etc.) and if more than one is provided, the processors may be contained in one or more computing devices (e.g., server, desktop computer, laptop computer, etc.) that may be located at any suitable location(s). Fundamentally, there are no limitations on the type and configuration of computing system 124 except that it is capable of suitably executing estimating algorithm(s) 120 and performing related functions, such as communicating with traffic cameras 104(1) to 104(N) and communicating with other systems as needed.

Estimating system 112 may provide the traffic density and/or flow estimates 120(1) to 120(N) to one or more intelligent traffic systems 136, which may use the estimates to affect the behavior of an actor (not shown). As noted above, examples of intelligent traffic systems that can be provided as intelligent traffic system(s) 136 include, but are not limited to, a self-driving vehicle, a control system for a self-driving vehicle, a traffic-control infrastructure control system (centralized or distributed), a navigation device, and a realtime traffic display system, among others, and any combination and/or number thereof.

The preceding description of FIG. 1 is directed to an embodiment in which estimating is performed by centralized estimating system 112 wherein the processing for determining traffic density and/or traffic flow estimates is performed remotely from traffic cameras 104(1) to 104(N). In an alternative embodiment, centralized estimating system 112 can be replaced by a distributed processing system in which the estimating processing for the image(s) 104I(1) to 104I(N) of each traffic camera 104(1) to 104(N) is performed locally to that traffic camera. For example, each traffic camera 104(1) to 104(N) may include an onboard computing system (not shown) that executes a locally stored estimating algorithm. In this context, the term "local" and like terms mean that the estimating is performed aboard each traffic camera 104(1) to 104(N) or performed by a suitable computing system in close proximity to each traffic camera, such as located in a protective enclosure proximate to the traffic camera. Those skilled in the art will readily understand what constitutes "local" processing versus "centralized" processing. It is noted that local processing can include the processing of images from two or more traffic cameras located in proximity to one another. For example, if a pair of cameras are located at the same intersection but are trained on differing regions of the intersection, that intersection may be provided with a single computing system to perform the estimating for both cameras. In a distributed estimating system such as this, each camera, or other local computing system, may provide the corresponding traffic density and/or traffic flow data to intelligent traffic system(s) 136.

Figure 2:
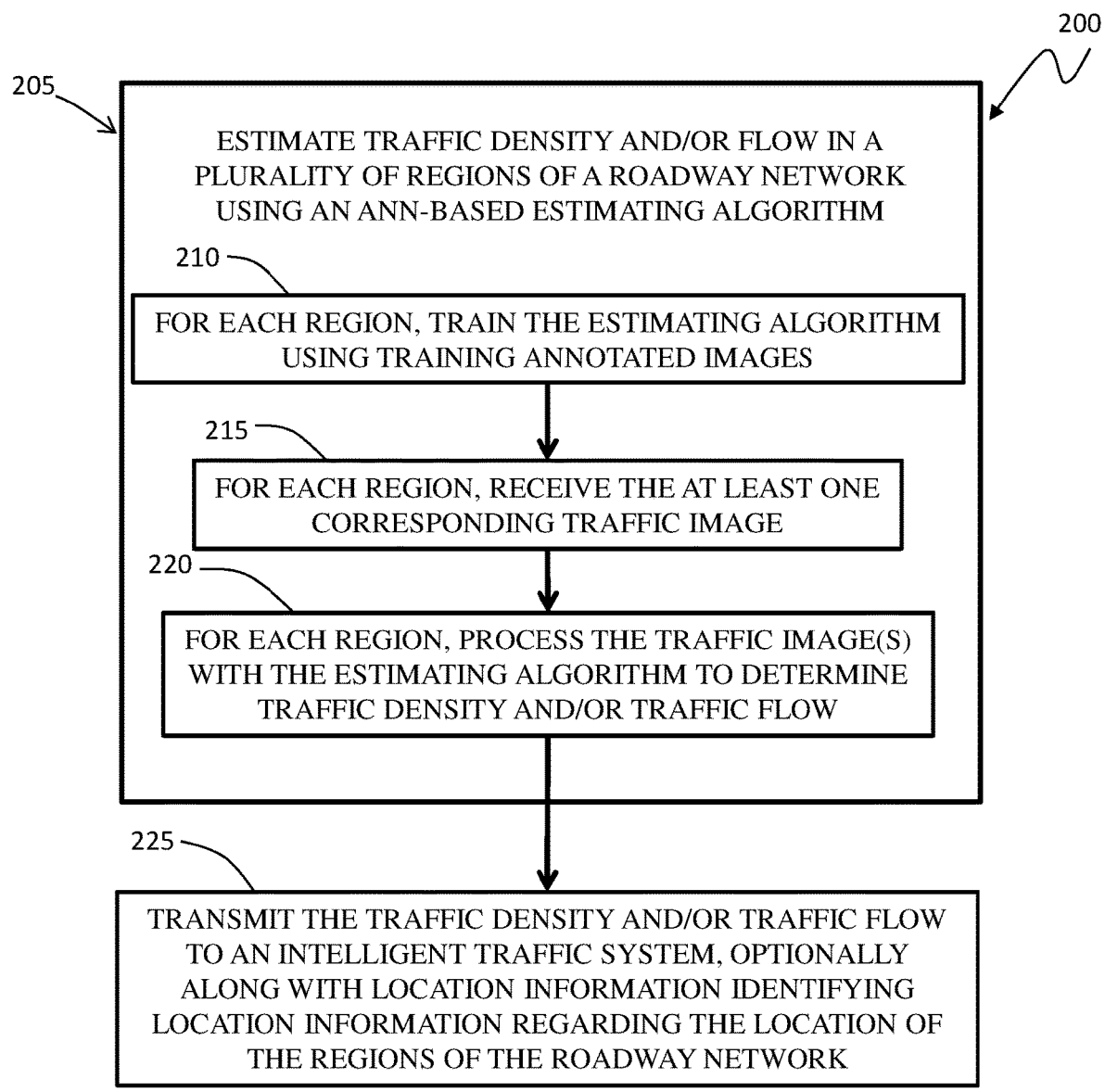
FIG. 2 is a diagram of an example method of providing traffic density and/or traffic flow data to an intelligent traffic system.

FIG. 2 illustrates an example method 200 of providing traffic density and/or traffic flow data to an intelligent traffic system, such as an intelligent traffic system 136 of FIG. 1. In this example, the traffic density and/or traffic flow data is for a plurality of regions of a roadway network (such as roadway network 108 of FIG. 1) in which each region has associated therewith a traffic camera (such as any one of traffic cameras 104(1) to 104(N) of FIG. 1) that captures at least one corresponding traffic image of the corresponding region of the roadway network. Method 200 can be implemented in virtually any vehicular-traffic implementation, such as vehicular-traffic implementation 100 of FIG. 1 having a plurality of traffic cameras 104(1) to 104(N). Referring to FIG. 2, at block 205 traffic density and/or traffic flow is estimated, locally to each traffic camera, in the corresponding region of a roadway or roadway network using an ANN-based estimating algorithm, such as estimating algorithm 120 of FIG. 1. Each region of the roadway may be any region, such as an intersection, a highway exchange, an approach to a toll collection structure, an entrance to a tunnel, portion of a bridge span, among many others. Typically, each region is a region where knowing the level of traffic is of interest. Each traffic camera 104(1) to 104(N) provides a single frame or a time-sequenced set of images, typically a video, the images of which estimating algorithm 120 analyzes to determine traffic density and/or traffic flow in the corresponding region. In some embodiments in which the traffic cameras are fairly rudimentary, each traffic image has a resolution of less than 350×250 pixels and a framerate of less than, for example, 1 frame per second.

At block 210 (FIG. 2), the estimating includes training, for each region, the estimation algorithm using training annotated images. The estimation algorithm is configured, when trained, to process one or more input images to automatically determine a traffic density and/or a traffic flow for traffic present in the one or more input images. Those skilled in the art will understand that the estimating algorithm will typically continually process images obtained from each traffic camera in the network to provide realtime traffic density and/or traffic flow estimates throughout a desired period, which may be a full day or one or more certain periods, such as at morning, noontime, and evening "rush hours," perhaps every day or only during the work week, or on any other desired schedule. Those skilled in the art will also understand that if traffic flow estimating is desired, the estimating algorithm must be suitably configured, and it must process time-sequenced images in order to detect the movement of vehicles in each scene.

At block 215, the estimating for each region of the roadway network includes receiving the traffic image(s) for that region. At block 220, the estimating further includes, following training of the estimating algorithm, processing, for each region, the traffic image(s) for that region with the estimating algorithm to determine the traffic density and/or traffic flow. At block 225, the determined traffic density and/or the traffic flow for each region is/are transmitted from local to each traffic camera to the intelligent traffic system, optionally along with locational information regarding the location of the region of the roadway.

It is noted that as used herein, the term "transmit" and like terms mean any manner of conveying the corresponding information or data, including but not limited to, wired transmission via any suitable protocol(s), wireless transmission via any suitable protocol(s), and any combination thereof, depending on the arrangements of relationships of physical components in a particular implementation. Locational information can be any information that indicates the location of the region of the roadway, such as GPS coordinates, intersection name, roadway name and location along the roadway, and camera identifier, among others, and any combination thereof. Fundamentally, the locational information can be any information that, alone or in combination with other information, such as a relational table, indicates the location of the roadway region.

Those skilled in the art will readily appreciate that blocks 205 to 220 can be adapted to estimate density and/or flow of objects other than vehicular traffic and need not be executed in the context of an intelligent traffic system. Indeed, the automatically determined object density and/or object flow data can be used for any suitable purpose, including systems having similar functionality to the example intelligent traffic systems noted above relative to FIG. 1.

Estimating Algorithms

As noted above, a number of estimating algorithms can be used for the density and/or flow estimating algorithms of the present disclosure, such as estimating algorithm 120 of estimating system 112 of FIG. 1. Results can be improved by combining an FCN network with a multitask learning (MT) network or, in the case of time-sequenced images, an LSTM network. In addition, an LSTM-enhanced FCN can be even further improved by enhancing an FCN-LSTM network with residual learning to create an FCN-rLSTM network. Examples of an FCN-MT network and an FCN-rLSTM network suitable for use in an estimating algorithm of the present disclosure are described in detail immediately below. Those skilled in the art will readily understand, however, that these examples are merely illustrative and that many variations, including abbreviations (e.g., by removing residual learning), can be made and that there are alternatives, such as those mentioned above relative to FIG. 1, that can be implemented in place of an FCN-based estimating algorithm. In addition, those skilled in the art will readily understand that specific equations presented herein are merely illustrative and that other equations can be used in their place to produce similar results.

FCN-MT Model (Single Images)

Some block-level optimization methods avoid individual vehicle detection and tracking by mapping dense image features into vehicle densities. They embed road geometry in the weight matrix and achieve promising results. Evaluating those methods led to the following insights: 1) it verifies the efficacy of mapping the dense features into vehicle densities for vehicle counting; 2) accounting for camera perspective is important to reduce the counting error; and 3) it reveals the necessity of considering correlation of nearby pixels. However, such methods suffer from limitations: 1) scale-invariant feature transform (SIFT) features cannot discriminate effectively each pixel; 2) their performance highly relies on background subtraction; and 3) their performance is sensitive to different scenes and to environmental conditions.

Considering the challenges of city traffic cameras described above and the limitations of block-level optimization methods, the present inventors have pursued a more robust and generalized model that can address the following challenging and crucial problems: 1) extract both representative and discriminative dense features; 2) understand urban traffic with additional rich information, such as vehicle count, type, and velocity; 3) detect small vehicles overcoming challenges such as high occlusion and low image resolution; 4) incorporate temporal information of the traffic videos; 5) adapt the model to multiple cameras and different environmental conditions; and 6) understand different camera perspectives.

With the hierarchical feature learning and state-of-the-art performance exhibited by deep neural networks, a deep multi-task model is used to replace a linear regression model with fully convolutional regression networks. To address the above problems, the present inventors have developed: 1) a deep multi-task learning framework based on fully convolutional neural networks (FCN-MT) to jointly learn vehicle density and vehicle types; 2) deep spatio-temporal networks to incorporate temporal information of traffic flow; and 3) a multi-domain adversarial training mechanism to adapt the model to different data domains. These techniques are described in the following subsections.

Figure 10:
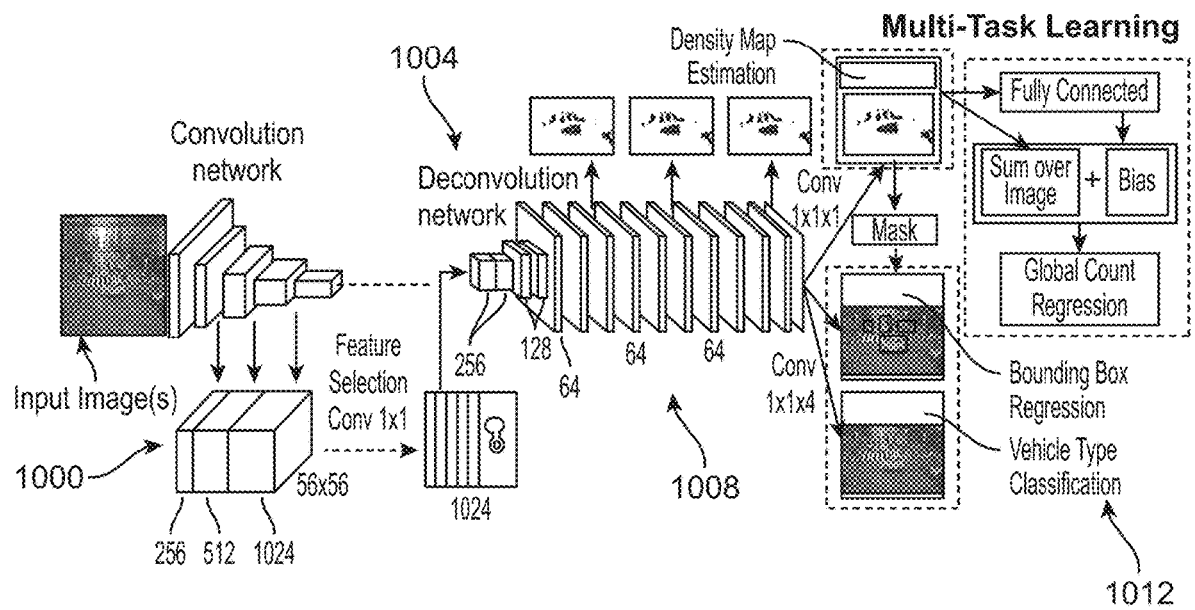
FIG. 10 is a high-level schematic diagram of an example multitask learning FCN (FCN-MT) network that can be implemented in an estimating algorithm of the present disclosure, such as the estimating algorithm of FIG. 1.

To overcome the limitations of the previous model, a deep multi-task model is used to jointly learn vehicle density and vehicle types. as illustrated in FIG. 10. To produce density maps that have the same size as the input image, an FCN is designed to perform pixel-wise prediction whole-image-at-a-time by dense feedforward computation and backpropagation. Multiple stage supervision of density map is added at the end of the network to increase the accuracy of density estimation. Vehicle type and bounding boxes are jointly learned with the density estimation task based on FCN. To detect vehicles with small scales and high occlusion, the estimated density map is taken as a prior of the vehicle detection. This method distinguishes this model from existing detection-based counting methods, which first detect individual vehicles and then count the number of vehicles. In the test stage, the system takes an image as input and outputs vehicle density, class confidence score, and predicted location offsets for each pixel. Global vehicle count is regressed in a residual learning manner from the estimated density map.

The vehicle type detection is decomposed into two tasks: vehicle bounding box regression and vehicle type classification. We define the left top and right bottom vertexes of the target bounding box as $b_l=(x_l, y_l)$ and $b_r=(x_r, y_r)$, respectively, then each pixel p located at $(x_p, y_p)$ in the output feature map describes a bounding box with a 5-dimensional vector $\tilde{T}_p=\{\tilde{s}, dx_l=\tilde{x}_p-x_l, dy_l=\tilde{y}_p-y_l, dx_r=\tilde{x}_p-x_r, dy_r=\tilde{y}_p-y_r\}$ wherein $\tilde{s}$ is the confidence score of being a certain vehicle type and $(dx_l, dy_l, dx_r, dy_r)$ denote the distances from output pixel location to the boundary of the target bounding box. The estimated density map is taken as the prior of the detection. The regions with high density is encouraged to output small bounding boxes, while the regions with low density are encouraged to output large bounding boxes. The overall structure of an example FCN-MT is illustrated in FIG. 10, which contains a convolution network 1000, a deconvolution network 1004, a feature combination and selection component 1008, and a multi-task learning component 1012.

FCN-based vehicle counting and detection faces three challenges: 1) variation of vehicle scales; 2) reduced feature resolution; and 3) high occlusion and small vehicle scales inducing a high miss rate for vehicle detection. To avoid large errors induced by scale variations, the example FCN-MT based methodology jointly performs global count regression and density estimation. Instead of directly regressing the global vehicle count from the last feature map, a residual learning framework is used to reformulate global count regression as learning residual functions with reference to the sum of densities in each frame. Such design avoids learning unreferenced functions and eases the training of the network.

The second challenge of reduced feature resolution is caused by the repeated combination of max-pooling and striding for conventional deep convolutional neural networks originally designed for image classification. This results in feature maps with significantly reduced spatial resolution. To solve this problem, the present methodology uses denser feature maps by combining appearance features from shallow layers with semantic features from deep layers. A convolution layer is then added after the combined feature volume with 1×1 kernels to perform feature selection. The selected features can better distinguish foreground and background. Thus the whole network is able to accurately estimate vehicle density without foreground segmentation.

To address the third challenge of high occlusion and small vehicle scale, instead of directly detecting individual vehicles, the vehicle bounding box is regressed with the prior of the estimated density map. Regions with positive density values are encouraged to have high confidence score, while the regions with zero density values should have low confidence score. Regions with large density values are also encouraged to have small bounding boxes, while the regions with small density values to have large bounding boxes.

Vehicle Density Estimation: At the last stage of the network, the FCN-MT based methodology jointly learns vehicle density, vehicle count, and vehicle type. In this example, the vehicle density is predicted by the last convolution 1×1 layer from the feature map. Euclidean distance is adopted to measure the difference between the estimated density and the ground truth. In this example, the loss function for density map estimation is defined as follows:

$$L_D(\Theta) = \frac{1}{2N} \sum_{i=1}^{N} \sum_{p=1}^{P} \|F(X_i(p)); \Theta) - F_i(p)\|_2^2 \qquad (1)$$

wherein $\Theta$ is the parameter vector of the FCN-MT model, N is the number of training images, and $F_i(p)$ is the ground truth density of pixel p.

Global Count Regression: The second task, global count regression, is reformulated as learning residual functions with reference to the sum of densities, which consists of two parts: 1) base count: the integration of the density map over the whole image; and 2) offset count: predicted by two fully connected layers from the feature map after the convolution 3×3 layer of the deconvolution network. The two parts are summed together to get the estimated vehicle count, as shown in the following equation:

$$C(i) = B(D(i); \gamma) + \sum_{p=1}^{P} D(i, p) \qquad (2)$$

wherein $\Upsilon$ is the learnable parameters of the two fully connected layers, B (D (i); $\Upsilon$ ) is the learned bias, and D(i,p) indicates the density of each pixel p in image i. It is hypothesized that it is easier to optimize the residual mapping than to optimize the original, unreferenced mapping. Considering that the vehicle count for some frames may have very large value, in this example Huber loss is adopted to measure the difference between the estimated count and the ground truth count. The count loss for one frame is defined as follows:

$$L_\delta(i) = \begin{cases} \frac{1}{2}(C(i) - C_t(i))^2 & \text{for } |C(i) - C_t(i)| \leq \delta \\ \delta|C(i) - C_t(i)| - \frac{1}{2}\delta^2 & \text{otherwise} \end{cases} \qquad (3)$$

wherein $C_t(i)$ is the ground truth vehicle count of frame i, C(i) is the estimated loss of frame i, and $\delta$ is the threshold to control the outlier in the training sets.

Vehicle Type Detection: The loss of the third task consists of two parts: vehicle type classification loss and bounding box regression loss. In one example, the vehicle type classification loss is defined as follows:

$$L_T(\tilde{s}, s^*) = \|\tilde{s} - s^*\|^2 \qquad (4)$$

wherein $\tilde{s}$ is the predicted confidence score, and $s^*$ is the ground truth label. In one example, the bounding box regression loss defined is as follows:

$$L_B(\tilde{d}, d^*) = \sum_{b \in \{x_l, y_l, x_r, y_r\}} \|\tilde{d}_b - d_b^*\|^2 \qquad (5)$$

wherein $\tilde{d}_b = (\tilde{d}_{x_l}, \tilde{d}_{y_l}, \tilde{d}_{x_r}, \tilde{d}_{y_r})$ denotes the predicted location offsets, and $d_b^* = (d_{x_l}^*, d_{y_l}^*, d_{x_r}^*, d_{y_r}^*)$ denotes the targets. Then, in one example, the overall loss function for the network is defined as:

$$L = L_D + \lambda \sum_{i=1}^{N} L_\delta(i) + \alpha L_T + \beta L_B \qquad 6)$$

wherein $\lambda$, $\alpha$, and $\beta$ are the weight of global count loss, vehicle type classification loss, and bounding box regression loss, respectively. By simultaneously learning the three related tasks, each task can be better trained with fewer parameters. Those skilled in the art will readily understand that Equations (4)-(6) are merely exemplary, as are other equations herein, and that other equations can be substituted therefor.

FCN-rLSTM Model and Network Architecture (Time-Sequenced Images)

Figure 3:
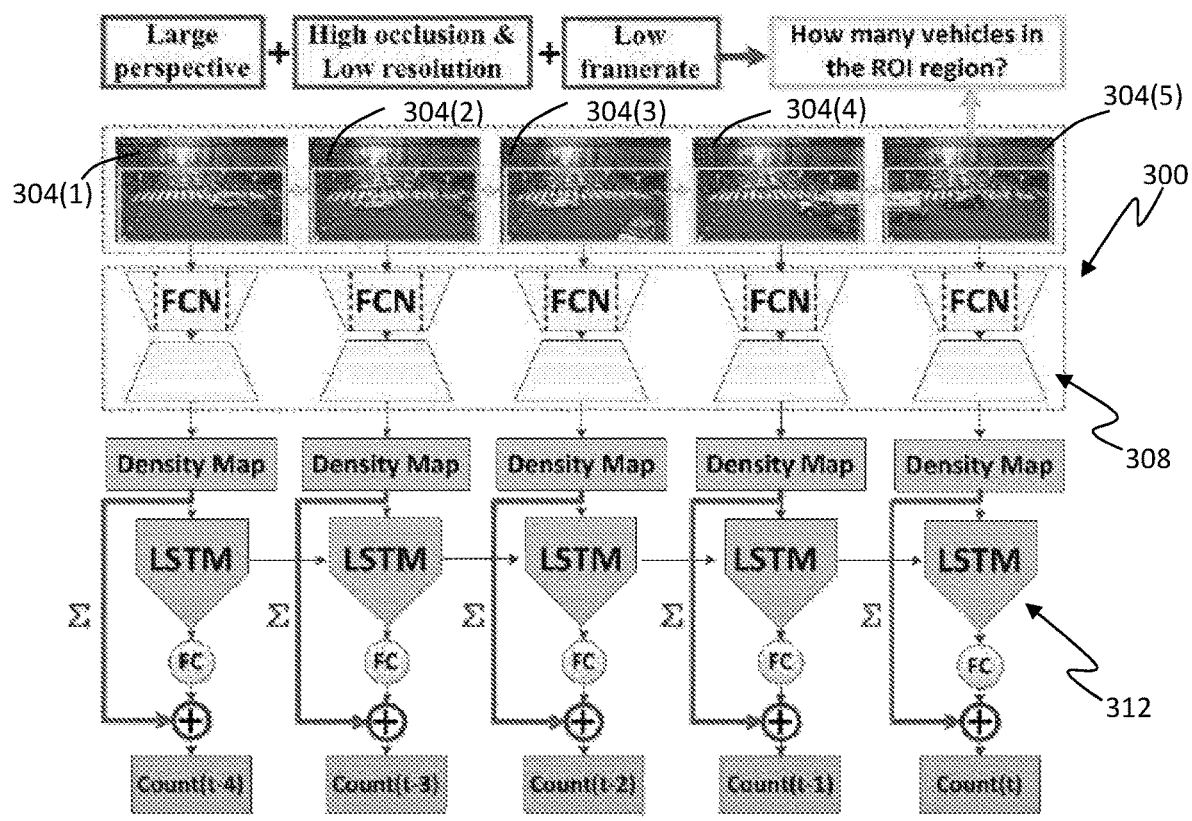
FIG. 3 is a high-level schematic diagram of an example FCN-rLSTM network that can be implemented in an estimating algorithm of the present disclosure, such as the estimating algorithm of FIG. 1.

FIG. 3 illustrates an example FCN-rLSTM network 300 in the context of a traffic density and/or flow estimating scenario, as depicted by the five time-sequenced video frames 304(1) to 304(5) of a city intersection acquired by a traffic camera (not shown). In this example, the traffic camera has a large perspective, low resolution, and low framerate, and the scene will often have high occlusions, such as larger vehicles occluding at least portions of smaller vehicles. In FCN-rLSTM network 300, FCNs 308 and LSTMs 312 are combined in a residual learning framework, leveraging the strengths of FCN for dense visual prediction and strength of LSTM for modeling temporal correlation. Video frames are input into FCN 308, and the output density maps are fed into a stack of LSTMs to learn residual functions with reference to the sum of densities in each frame. The global vehicle count is finally generated by summing the learned residual and the densities.

As the low spatial and temporal resolution and high occlusion of traffic camera videos preclude existing detection or motion-based methods for vehicle counting, the present example applies FCN 308 to map the dense (pixel-level) feature into vehicle density and to avoid detecting or tracking individual vehicles. FCN 308-based density estimation allows arbitrary input resolution and outputs vehicle density maps that are of the same size as the input image. Existing object counting literature estimates the object density map and directly sums the density over the whole image to get the object count. But such methods suffer from large error when the video has large perspective and oversized vehicles (e.g., large bus or large truck). The present FCN-rLSTM network 300, however, is used to jointly estimate vehicle density and vehicle count by connecting FCN 308 with LSTM 312 in a residual learning fashion. Such design leverages the strengths of FCN 308 for pixel-level prediction and the strengths of LSTM 312 for learning complex temporal dynamics. Counting accuracy is significantly improved by taking the temporal correlation of vehicle counts into account. However, it is not easy to train the combined FCN 308 and LSTM 312 networks. Residual connection of FCN 308 and LSTM 312 is added to accelerate the training process. The resulting end-to-end trainable network has a high convergence rate and further improves the counting accuracy.

Figure 4:
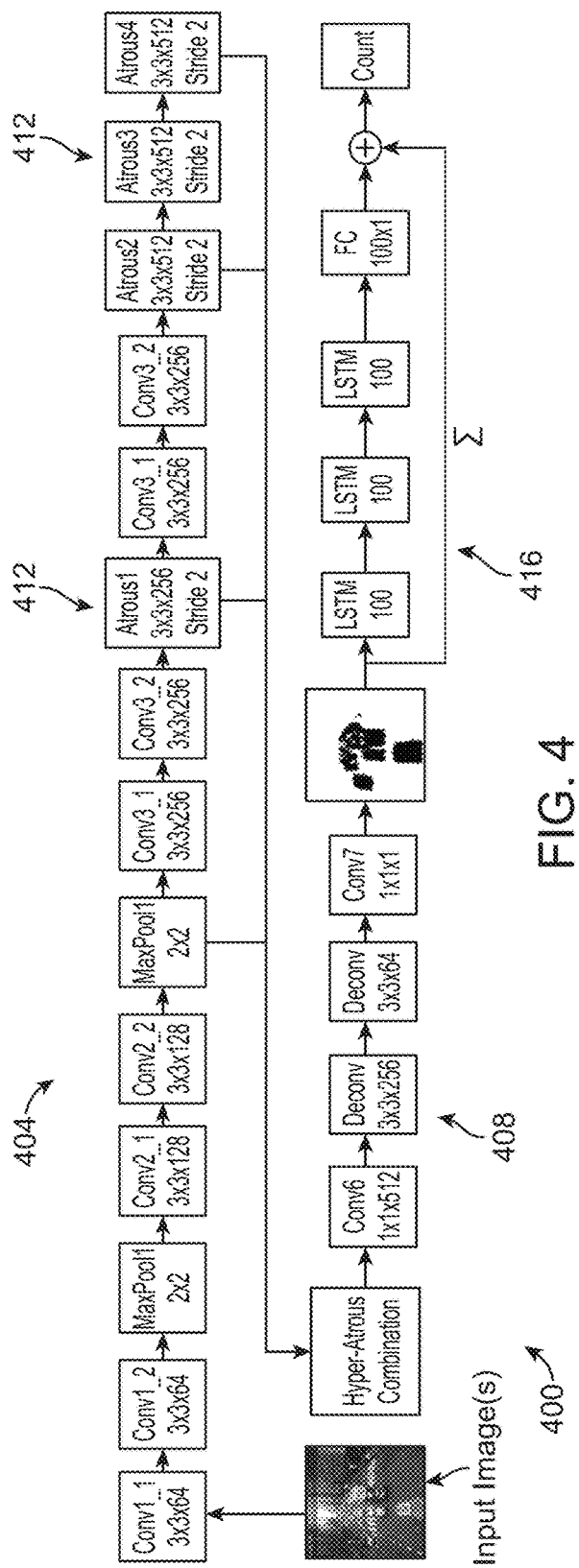
FIG. 4 is a schematic diagram of the architecture of the FCN-rLSTM network of FIG. 3.

The architecture 400 of example FCN-rLSTM network 300 of FIG. 3, along with example detailed parameters, is shown in FIG. 4. As seen in FIG. 4, network architecture 400 includes a convolution network 404, deconvolution network 408, hyperatrous feature combination 412, and LSTM layers 416. In this example, small kernels of size 3×3 are applied to both convolution (cony) layers of convolution network 404 and deconvolution (deconv) layers of deconvolution network 408. Also in this example, the number of filter channels in the higher layers are increased to compensate for the loss of spatial information caused by max pooling.

To preserve feature map resolution, hyperatrous combination is used. In hyperatrous combination, atrous convolution is integrated into the convolution networks and the feature maps after the second max-pooling layer, and the atrous convolution layers are combined together into a deeper feature volume. Atrous convolution amounts to filter upsampling by inserting holes between nonzero filter taps. It computes feature maps more densely, followed by simple bilinear interpolation of the feature responses back to the original image size. Compared to regular convolution, atrous convolution effectively enlarges the field of view of filters without increasing the number of parameters.

After several atrous convolution layers, the features from the second max-pooling layer and the atrous convolution layers are combined. And then, after the combined feature volume, a convolution layer with 1×1 kernels is used to perform feature re-weighting to encourage the re-weighted feature volume to distinguish better foreground and background pixels. The combined and re-weighted feature volume is input of the deconvolution network that contains two deconvolution layers. At the top of FCN 308 (FIG. 3), a convolution layer with 1×1 kernel acts as a regressor to map the features into vehicle density.

To incorporate the temporal correlation of vehicle counts from sequential frames, we combine LSTM 312 (FIG. 3) is combined with FCN 308 to jointly learn vehicle density and count. RNN maintains internal hidden states to model the dynamic temporal behavior of sequences. LSTM extends RNN by adding three gates to an RNN neuron: a forget gate $f_t$; an input gate $i_t$; and an output gate $o_t$. These gates enable LSTM 312 (FIG. 3) to learn longterm dependencies in a sequence and make it easier to be optimized. LSTM 312 effectively deals with the gradient vanishing/exploding issues that commonly appear during RNN training. It also contains cell activation vector $c_t$ and hidden output vector $h_t$. The output density map of FCN is reshaped into a 1D vector $x_t$, and this vector is fed into three LSTM layers. In this example, each LSTM layer has 100 hidden units and is unrolled for a window of 5 frames. The gates apply sigmoid nonlinearities $\sigma_i$, $\sigma_f$, $\sigma_o$, and tan h nonlinearities $\sigma_c$, and $\sigma_h$ with weight parameters $W_{hi}$, $W_{hf}$, $W_{ho}$, $W_{xi}$, $W_{xf}$, and $W_{xo}$, which connect different inputs and gates with the memory cells, outputs, and biases $b_i$, $b_f$, and $b_o$. The commonly-used update equations are defined as:

$$i_t = \sigma_i(x_t W_{xi} + h_{t-1} W_{hi} + w_{ci} \odot c_{t-1} + b_i)$$

$$f_t = \sigma_f(x_t W_{xf} + h_{t-1} W_{hf} + w_{cf} \odot c_{t-1} + b_f)$$

$$c_t = f_t \odot c_{t-1} + i_t \odot \sigma_c(x_t W_{xc} + h_{t-1} W_{hc} + b_c)$$

$$o_t = \sigma_o(x_t W_{xo} + h_{t-1} W_{ho} + w_{co} \odot c_t + b_o)$$

$$h_t = o_t \odot \sigma_h(c_t) \tag{7}$$

Figure 5:
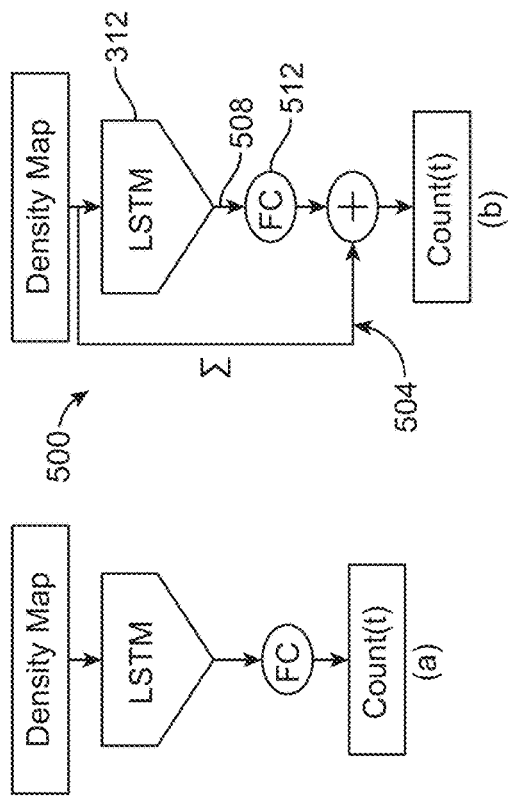
FIG. 5 is a high-level schematic diagram illustrating differences between a direct connected FCN-LSTM (FCN-dLSTM) network and a residual learning FCN-LSTM (FCN-rLSTM) network.

To accelerate training, FCN 308 (FIG. 3) and LSTM 312 are connected in a residual learning fashion as illustrated at (b) in FIG. 5. The sum 500 of the learned density map over each frame is taken as a base count 504, and the output hidden vector 508 of the last layer of LSTM 312 is fed into one fully connected layer 512 to learn the residual between base count and final estimated count. Compared to the direct connection of an FCN and a LSTM illustrated at (a) of FIG. 5, the residual connection eases the training process and increases counting accuracy.

Spatio-Temporal Multi-Task Learning

The ground truth supervision for FCN-rLSTM network 300 (FIG. 3) includes two types of information: the pixel-level density map and the global vehicle count for each frame. Generation of the ground truth supervision depends on how the objects are annotated. If the center of each object is labeled as a dot d, the ground truth vehicle count for frame i is the total number of labeled dots. The ground truth density $F_i^0(p)$ for each pixel p in image i is defined as the sum of 2D Gaussian kernels centered at each dot annotation covering pixel p:

$$F_i^0(p) = \sum_{d \in D_i} N(p; d, \delta) \tag{8}$$

wherein $D_i$ is the set of the dot annotations, d is each annotation dot, and $\delta$ of the Gaussian kernel is decided by the perspective map. If each object is annotated by a bounding box $B=(x_1, y_1, x_2, y_2)$, where $(x_1, y_1)$ are the coordinates of the left top point and $(x_2, y_2)$ are the coordinates of the right bottom point, the ground truth vehicle count for frame i is the total number of bounding boxes in frame i. The center o of each bounding box B is: $o_x = \frac{1}{2}(x_1 + x_2)$, $o_y = \frac{1}{2}(y_1 + y_2)$. Then, the ground truth density $F_i^0(p)$ for each pixel p in image i is defined as:

$$F_i^0(p) = \sum_{o \in O_i} N(p; o, \delta) \tag{9}$$

wherein the parameter $O_i$ is the set of bounding box centers in frame i. $\delta$ of the Gaussian kernel is decided by the length of the bounding box.

The task of FCN 308 (FIG. 3) is to estimate the pixel-level density map, and the task of LSTM 312 is to estimate the global vehicle count for each frame. These two tasks are jointly achieved by training the whole FCN-rLSTM network end-to-end. The vehicle density is predicted from the feature map by the last convolution 1×1 layer of FCN 308. Euclidean distance is adopted to measure the difference between the estimated density and the ground truth. The loss function for density map estimation is defined as follows:

$$L_D = \frac{1}{2N} \sum_{i=1}^{N} \sum_{p=1}^{P} \|F_i(p; \Theta) - F_i^0(p)\|_2^2 \tag{10}$$

wherein N is the batch size and $F_i(p)$ is the estimated vehicle density for pixel p in image i, and $\Theta$ is the parameter of FCN. The second task, global count regression, is learned from the LSTM layers including two parts: (i) base count: the integration of the density map over the whole image; and (ii)

residual count: learned by the LSTM layers. The two are summed to get the estimated vehicle count:

$$C_i = G(F_i; \Gamma, \Phi) + \sum_{p=1}^{P} F_i(p) \quad (11)$$

wherein $G(F_i; \Gamma, \Phi)$ is the estimated residual count, $F_i$ is the estimated density map for frame i, $\Gamma$ is the learnable parameters of LSTM, and $\Phi$ is the learnable parameters of the fully connected layers. It is hypothesized that it is easier to optimize the residual mapping than to optimize the original mapping. The loss of the global count estimation is:

$$L_C = \frac{1}{2N} \sum_{i=1}^{N} (C_i - C_i^0)^2 \quad (12)$$

wherein $C_i^0$ is the ground truth vehicle count of frame i, $C_i$ is the estimated count of frame i. Then overall loss function for the network is defined as:

$$L = L_D + \lambda L_C \quad (13)$$

wherein $\lambda$ is the weight of the global count loss, and it should be tuned to achieve best accuracy. By simultaneously learning the two related tasks, each task can be better trained with much fewer parameters.

The loss function is optimized via batch-based Adam optimizer, though other optimizers can be used. Algorithm 1, below, outlines the example FCN-rLSTM training process. As FCN-rLSTM can adapt to different input image resolutions and variation of vehicle scales and perspectives, it is robust to different scenes.

---

Algorithm 1: FCN-rLSTM Training Algorithm

---

Input : Images: $\{I_{11}, ..., I_{nm}\}$, wherer n is the
    number of sequences and m is the number of
    unrolled frames.
Label : Density Maps: $\{F_{11}^0, ..., F_{nm}^0\}$
Output: Parameters of FCN, LSTM, and FC: $\Theta, \Gamma, \Phi$
1 for i = 1 to max_iteration do
2   | for j = 1 to unroll_number do
3   |   | $F_{ij}$ = FCN($I_{ij}; \Theta$)
4   |   | $L_{Dj} = L_2(F_{ij}, F_{ij}^0)$
5   |   | $C_{residual}$ = FC(LSTM($F_{ij}; \Gamma$); $\Phi$)
6   |   | $C_{ij} = \Sigma F_{ij} + C_{residual}$
7   |   | $L_{Cj} = L_2(\Sigma F_{ij}^0, C_{ij})$
8   | end
9   | $L = \Sigma L_{Dj} + \lambda \Sigma L_{Cj}$
10   | $\Theta, \Gamma, \Phi \leftarrow$ Adam($L, \Theta, \Gamma, \Phi$)
11 end

---

Example Results Using FCN-rLSTM

In this section, experiments and quantitative results are discussed. First, the example FCN-rLSTM methodology described above was evaluated and compared with state-of-the-art methods on public dataset Web-CamT. 2. Next, the example FCN-rLSTM methodology was evaluated on the public dataset TRANCOS. Finally, to verify the robustness and generalization of the FCN-rLSTM model, the example FCN-rLSTM methodology was evaluated on the public crowd counting dataset UCSD. Each of these experiments is described below.

Quantitation Evaluations on WebCamT

WebCamT is a public dataset for large-scale city camera videos, which have low resolution (352×240), low frame rate (1 frame/second), and high occlusion. Both bounding box and vehicle count are available for 60,000 frames. The dataset is divided into training and testing sets, with 45,850 and 14,150 frames, respectively, covering multiple cameras and different weather conditions.

The example FCN-rLSTM methodology described above was evaluated on the 14,150 test frames of WebCamT, which contains 61 videos from 8 cameras. These videos cover different scenes, congestion states, camera perspectives, weather conditions, and time of the day. The training set contained 45,850 frames with the same resolution, but from different videos. Both training and testing sets were divided into two groups: downtown cameras and parkway cameras. Mean absolute error (MAE) was employed for evaluation. For FCN-rLSTM, the weight of the vehicle count loss was 0.01. The learning rate was initialized by 0.0001 and adjusted by the first and second order momentum in the training process. To test the efficacy of the proposed hyperatrous combination, combination of FCN and LSTM and the residual connection, different configurations of FCN-rLSTM were evaluated as shown in Table 1, below. In Table 1: "Atrous" indicates the atrous convolution; "Hyper" indicates hypercolumn combination of the feature maps; "Direct connect" indicates combining FCN with LSTM directly; and "Residual connect" indicates connecting FCN with LSTM in residual fashion.

TABLE 1

Different configurations of FCN-rLSTM

| Configuration | Atrous | Hyper | Direct connect | Residual connect |
|---|---|---|---|---|
| FCN-A | ✓ | X | X | X |
| FCN-H | X | ✓ | X | X |
| FCN-HA | ✓ | ✓ | X | X |
| FCN-dLSTM | ✓ | ✓ | ✓ | X |
| FCN-rLSTM | ✓ | ✓ | X | ✓ |

Data Augmentation: To make the model more robust to various cameras and weather conditions, several data augmentation techniques were applied to the training images: 1) horizontal flip; 2) random crop; 3) random brightness; and 4) random contrast. It is noted that other data augmentation techniques can also be applied.

Baseline Approaches: The present example FCN-rLSTM method was compared with three methods: *Baseline 1: Learning to count* (A. Z. V. Lempitsky. "Learning to count objects in images," in *Advances in Neural Information Processing Systems (NIPS)*, ACM, 2010). This work maps each pixel's feature into object density with uniform weight for the whole image. For comparison, dense SIFT features were extracted for each pixel using VLFeat (A. Vedaldi and B. Fulkerson, "VLFeat: An open and portable library of computer vision algorithms," 2008) and learned the visual words. *Baseline 2: Hydra* (D. Onoro-Rubio and R. J. Lopez-Sastre, "Towards perspective-free object counting with deep learning," in *European Conference on Computer Vision*, pages 615-629, Springer, 2016). It learns a multi-scale non-linear regression model that uses a pyramid of image patches extracted at multiple scales to perform final density prediction. The Hydra 3s model was trained on the same training set as FCN-rLSTM. *Baseline 3: FCN* (S. Zhang, G. Wu, J. P. Costeira, and J. M. F. Moura, "Understanding traffic density from large-scale web camera data," in *Proceedings of the IEEE Conference on Computer Vision and Pattern Recognition*, pages 5898-5907, IEEE, 2017). It develops a deep multi-task model to jointly estimate vehicle density and vehicle count based on FCN. FCN was trained on the same training set as FCN-rLSTM.

Experimental Results: The error of the proposed and baseline approaches are compared in Table 2, below. From the results, it is seen that the example FCN-rLSTM approach outperformed all the baseline approaches and all the other configurations. As the testing data cover different congestion states, camera perspectives, weather conditions, and time of the day, these results verify the efficacy and robustness of FCN-rLSTM. To do ablation analysis of the proposed techniques, the performance of different configurations as shown in Table 2 were also evaluated.

TABLE 2

Results comparison on WebCamT

| Method | Downtown | Parkway |
| --- | --- | --- |
| Baseline 1 | 5.91 | 5.19 |
| Baseline 2 | 3.55 | 3.64 |
| Baseline 3 | 2.74 | 2.52 |
| FCN-A | 3.07 | 2.75 |
| FCN-H | 2.48 | 2.30 |
| FCN-HA | 2.04 | 2.04 |
| FCN-dLSTM | 1.80 | 1.82 |
| FCN-rLSTM | 1.53 | 1.63 |

With the hyperatrous combination, FCN-HA itself already outperforms all the baseline methods and achieved better accuracy than FCN-A and FCN-H, which verifies the efficacy of the hyperatrous combination. FCN-rLSTM had higher accuracy than FCN-HA and FCN-dLSTM (direct connected), which verifies the efficacy of the residual connection of FCN and LSTM. From evaluations of counting results comparisons (not shown) of FCN-HA with FCN-rLSTM relative to parkway cameras and downtown cameras, it is concluded that FCN-rLSTM better estimates the vehicle count and reduces large counting errors induced by oversized vehicles. Without foreground segmentation, the learned density map can still distinguish background from foreground in both sunny, rainy and cloudy, dense and sparse scenes.

Besides the high accuracy achieved by FCN-rLSTM, the convergence of the proposed approach is also improved significantly. The residual connection of FCN and LSTM also enables faster convergence than the direct connection.

Quantitation Evaluations on TRANCOS

The example FCN-rLSTM methodology was also evaluated on a public dataset TRANCOS to verify its efficacy. TRANCOS is a collection of 1,244 images of different traffic scenes from surveillance camera videos. It has 46,796 annotated vehicles in total and provides a region of interest (ROI) for each image. Images of TRANCOS are from very different scenarios and no perspective maps are provided. The ground truth vehicle density maps are generated by the 2D Gaussian Kernel in the center of each annotated vehicle.

TABLE 3

Results comparison on TRANCOS dataset

| Method | MAE | Method | MAE |
| --- | --- | --- | --- |
| Baseline 1 | 13.76 | Baseline 3 | 5.31 |
| Baseline 2-CCNN | 12.49 | FCN-HA | 4.21 |
| Baseline 2-Hydra | 10.99 | FCN-rLSTM | 4.38 |

The MAE of the proposed method and baseline methods are compared in Table 3, above. Baseline 2-CCNN is a basic version of the network in the Onoro-Rubio et al. Hydra reference cited above, and Baseline 2-Hydra augments the performance by learning a multiscale regression model with a pyramid of image patches to perform the final density prediction. All the baselines and proposed methods were trained on 823 images and tested on 421 frames following the separation in Onoro-Rubio et al. Hydra reference cited above. From the results, it can be seen that FCN-HA significantly decreased the MAE from 10.99 to 4.21 compared with Baseline 2-Hydra, and decreases the MAE from 5.31 to 4.21 compared with Baseline 3. As the training and testing images of TRANCOS were random samples from different cameras and videos, they lacked consistent temporal information. Thus FCN-rLSTM could not learn temporal patterns from the training data. The performance of FCN-rLSTM was not as good as FCN-HA, but it already outperforms all the baseline methods. When applying the present example FCN-rLSTM method to other datasets, the FCN-rLSTM configuration can be chosen for datasets that have temporal correlation and the FCN-HA configuration can be chosen for datasets that do not have temporal correlation. The estimated counts of the example FCN-rLSTM methodology are evidently more accurate than that of the baseline methods. FCN-rLSTM and FCN-HA have comparable estimation accuracy of vehicle counts.

Quantitative Evaluations on UCSD Dataset

To verify the generalization and robustness of the present example FCN-rLSTM methodology in different counting tasks, the FCN-rLSTM methodology was evaluated and compared with baselines on the pedestrian counting dataset UCSD. This dataset contains 2,000 frames chosen from one surveillance camera. The frame size is 158×238 and frame rate is 10 fps. The average number of people in each frame is around 25. The dataset provides the ROI for each video frame. Frames from 601 to 1,400 were used as training data, and the remaining 1,200 frames were used as test data. Table 4, below, shows the results of present example FCN-rLSTM method and existing methods, from which it can be seen that FCN-rLSTM outperformed all the baseline methods and the FCN-HA configuration. These results show present example FCN-rLSTM methodology is robust as compared to other types of counting tasks.

TABLE 4

Results comparison on UCSD dataset

| Method | MAE | MSE |
| --- | --- | --- |
| Kernel Ridge Regression | 2.16 | 7.45 |
| Ridge Regression | 2.25 | 7.82 |
| Gaussian Process Regression | 2.24 | 7.97 |
| Cumulative Attribute Regression | 2.07 | 6.86 |
| Cross-scene DNN | 1.6 | 3.31 |
| Baseline 3 | 1.67 | 3.41 |
| FCN-HA | 1.65 | 3.37 |
| FCN-rLSTM | 1.54 | 3.02 |

Training of Estimating Algorithm

Training of an estimating algorithm of the present disclosure, such as estimating algorithm 120 of estimating system 112 of FIG. 1, is extremely challenging due to a number of factors, including highly variable lighting conditions, highly variable weather conditions, high incidence of occlusions, and high variability of object types being counted. Further complicating the challenge is the fact that training images need to be annotated to create ground truth images for the training. Generally, human annotation is preferred due to human ability to accurately annotate images. However, because large numbers of annotated images are needed due to the great variability of the challenging factors noted above, human annotation would be prohibitively expensive, especially when an estimating system of the present disclosure is deployed on a large scale, such as, for example, throughout an entire network, or even a portion thereof, of traffic cameras for a city or region where tens, hundreds, or more cameras provide images of tens, hundreds, or more locations throughout a roadway network. Consequently, less costly methodologies for creating images for training an estimating algorithm of the present disclosure are needed. Two such methodologies, namely, a synthetic image methodology and a hybrid image methodology are described in this section. The synthetic image methodology allows the creation of a more accurate density map needed to train algorithm 120 of estimating system 112 of FIG. 1. The hybrid image methodology allows the creation of synthetic annotated images at no cost.

Synthetic Training Image Generation

Figure 6:
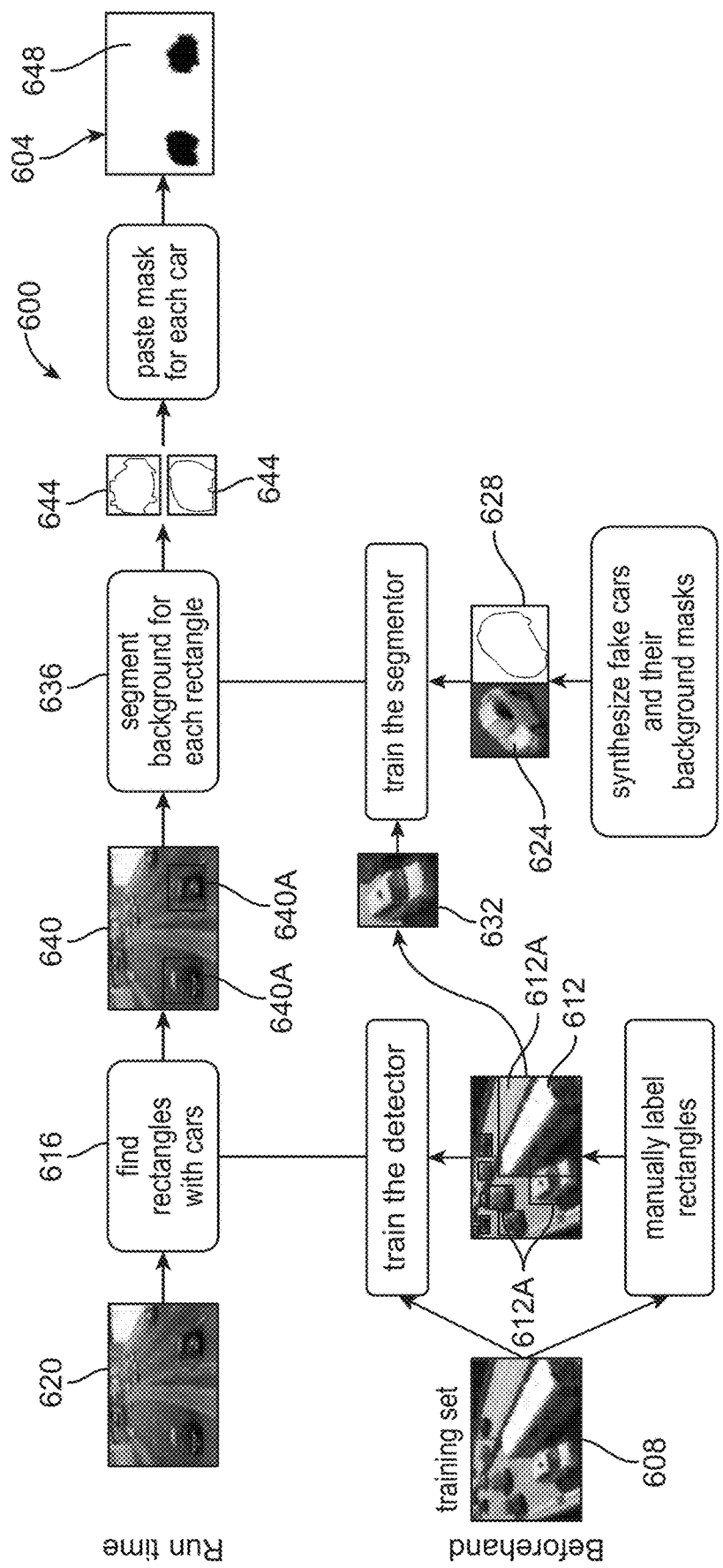
FIG. 6 is a diagram of an example method of generating a set of synthetic training images for training an ANN-based network.
Figure 7:
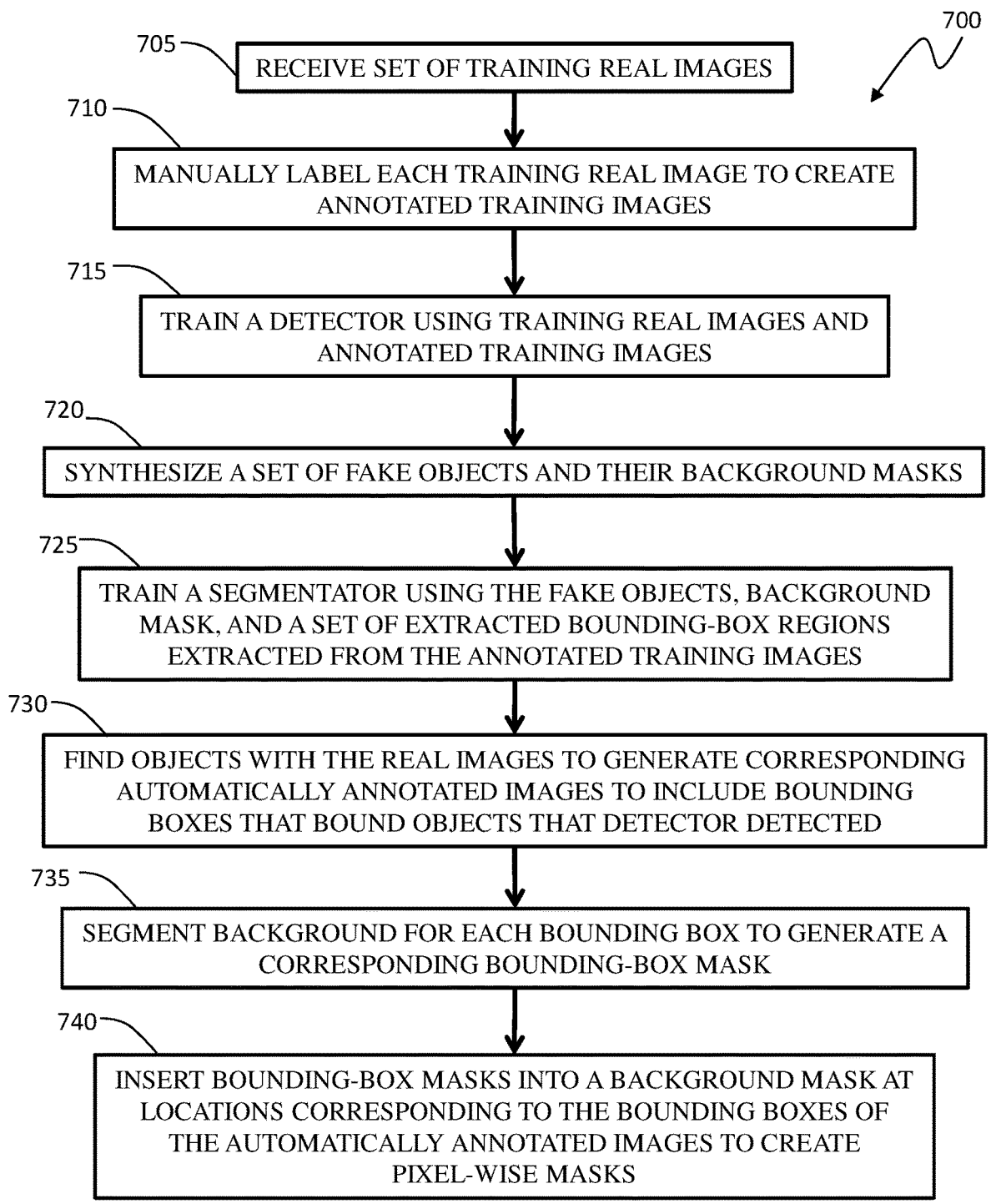
FIG. 7 is a schematic diagram of an example synthetic training image generating system that can be used to perform the method of FIG. 6.

Referring now to FIG. 6 and FIG. 7, FIG. 7 illustrates an example method 700 of generating a set of pixel-wise masks 604 (FIG. 6), and FIG. 6 illustrates an example synthetic training image generating system 600. (It is noted that 600-series numerals refer to elements found in FIGS. 6 and 700-series numerals refer to elements found in FIG. 7.) At block 705, a set of training real images 608 is received. In this example, training real images 608 are actual images captured by a camera that, when the estimating system trained using method 700 is deployed, such as estimating system 112 of FIG. 1, is a camera that will provide realtime images for analysis by the estimating system.

At block 710, each training real image 608 is manually labelled by a human annotator with one or more rectangles, such as rectangles 612A (only a couple labeled for convenience), with each rectangle representing a bounding box that minimally bounds a corresponding real object, here, vehicles, within the image. Such manual annotating creates a set of annotated training images 612. At block 715, real annotated training images 612 are used to train an ANN-based detector 616 that, during run-time, will automatically annotate real images 620 with pixel-wise masks 604.

At block 720, a set of fake objects 624, here, vehicles, and their background masks 628 are synthesized. At block 725, fake objects 624, background masks 628, and a set of extracted bounding-box regions 632 extracted from annotated training images 612 are used to train an ANN-based segmentator 636. Once detector 616 and segmentator 636 have been trained, the process of automatically generating pixel-wise masks 604 can begin.

At block 730, after training, detector 616 finds objects, here, vehicles, within real images 620 to generate corresponding automatically annotated images 640 annotated to include bounding boxes 640A that bound corresponding respective objects that detector detected. At block 735, segmentator 636 segments, for each automatically annotated image 640, background for each bounding box 640A to generate a corresponding bounding-box mask 644. At block 740, bounding-box masks 644 are inserted into a background mask 648 at the locations corresponding to bounding boxes 640A of automatically annotated images to create pixel-wise masks 604. At this point, pixel-wise masks 604 can be used to generate density maps for training any suitable estimating algorithm, such as estimating algorithm 120 of FIG. 1. Such density maps can be more accurate than those generated from annotated rectangles. Those skilled in the art will readily appreciate that once detector 616 and segmentator 636 have been suitably trained, they may be used to generate many pixel-wise vehicle masks for any number of images annotated with rectangles with virtually no cost other than the cost of powering the computing system used to perform method 700.

Hybrid Training Image Generation

Figure 8:
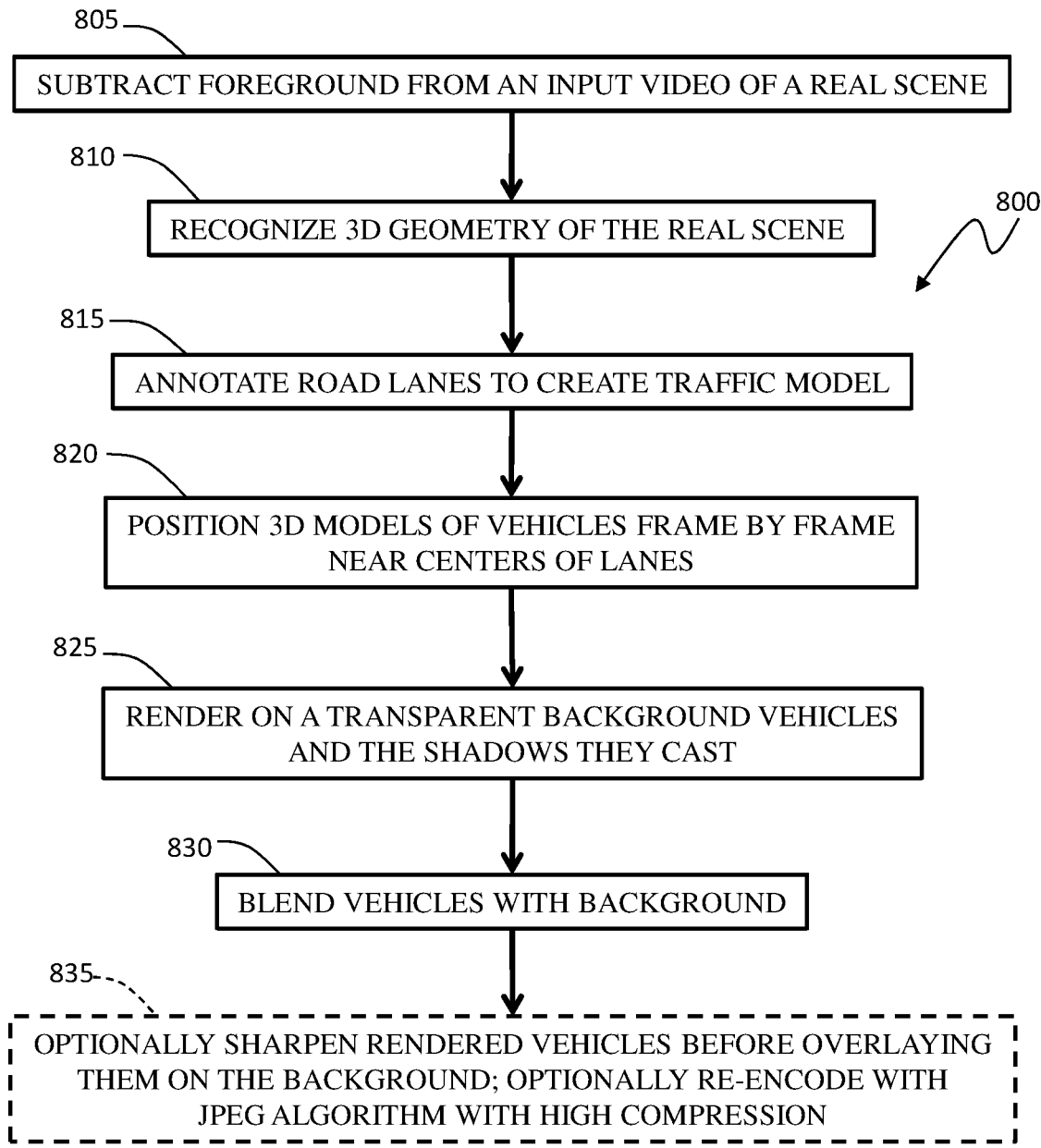
FIG. 8 is a schematic diagram of an example method of generating a video of hybrid training images for training an ANN-based network.

FIG. 8 illustrates a method 800 of generating a video of hybrid training images. At block 805 the foreground is subtracted from an input video taken of a real scene. In the context of a vehicular traffic implementation in which the scene is of roadway, the subtraction results in a video of an empty road. (For convenience, from this point on, the description of method 800 is based on a vehicular traffic implementation. However, those skilled in the art will readily understand how method 800 can be adapted to other implementations.) To do the subtraction, first the foreground in the video is detected. The foreground includes cars, their shadows, and some image artifacts. In simple cases, Gaussian Mixture Models (GMMs), which model each pixel independently to belong to either background or foreground, can be employed. Second, the background video is generated frame by frame with the Formula 7, below. Non-masked areas of each new frame update the background with update rate $\eta$:

$$\text{background}[t] = \text{background}[t-1] - \eta(1-\text{mask}[t]) \otimes \text{back}[t-1] + \eta(1-\text{mask}[t]) \otimes \text{frame}[t] \qquad (7)$$

At block 810, the 3D geometry of the real scene is recognized. Since the goal is to render vehicles as viewed from a specific viewpoint, it is necessary to first learn the scene 3D geometry for every camera that will be part of the implementation of the estimating system. Scene 3D geometry includes camera extrinsic parameters (location and rotation) and intrinsic parameters. Under perspective camera models the intrinsic parameters include focal length, center offset, skew, and non-linear distortions. For many surveillance cameras, it can be assumed there is zero center offset, no skew, or non-linear distortions. To further simplify the task, the ground is taken to be flat. At block 815, the road lanes are annotated to create a traffic model.

For each frame of the original video, a synthetic video is generated frame by frame. Synthesizing a hybrid frame includes four steps. At block 820, 3D models of vehicles are positioned in a frame near centers of lanes. Vehicles are assumed to not change lanes, and distances between cars may be chosen automatically and may vary from high (sparse traffic) to low, corresponding to a traffic jam. A number of random 3D CAD vehicle models are arranged in the scene according to the traffic model created at block 815. Lighting conditions in the scene are set up according to the weather in the source video. In one example weather is modeled to be one of the following types: sunny, cloudy, wet, and rainy. These types reflect the amount of lighting the scene gets, shadows, and the appearance of the ground that one experienced in the video. The ground is made to be reflective for wet and rainy weather. In sunny weather, the angle of the sun is set based on the real position of the sun at the time when the video frame was recorded. Additionally, shadows of surrounding shapes are cast on cars.

At block 825, the vehicles and the shadows they cast on the roadway are rendered on the transparent background. For the purposes of data augmentation, the saturation and brightness of the rendered image may be varied, if desired. A scene depth map may also be rendered and used to deduce mutual occlusion between vehicles in the scene. In one example, if a vehicle is more than 50% occluded, it is omitted from the training image.

At block 830, the vehicles are blended with the background. Image saturation and brightness may be varied to increase data variability. The rendered images are overlaid on top of the frame background, and vehicle shadows are blurred to conceal the noise introduced by the rendering engine. At block 835, to emulate artifact in real video, the rendered vehicles may optionally be sharpened before overlaying them on the background, and the final image may optionally be re-encoded with a JPEG algorithm with high compression. Once the hybrid synthetic video is completed, it can be used for training a suitable estimating algorithm, such as estimating algorithm 120 of FIG. 1.

Multi-Camera Domain Adaptation with Adversarial Learning

Nowadays, many cities are monitored with hundreds of traffic cameras. Taking New York City (NYC) as an example, there are currently 564 web cameras installed in NYC. Differing cameras have differing scenes, backgrounds, and perspectives. Even for the same camera, perspective, weather, and illumination can change over time. All these factors result in differing data domains. However, it is difficult to label a large number of training images for all these cameras having differing data domains. In the present context, cameras with abundant labeled images are referred to as "source cameras," whereas cameras with no label information are referred to as "target cameras." A crucial issue here is how to adapt the deep model trained on source cameras to target cameras. As there can be tens, hundreds, or more of cameras to deal with, resulting in multiple source camera domains and target domains, the present inventors have developed multi-camera domain adaptation with adversarial learning (MDA) methodologies to adapt the deep neural networks trained on multiple source cameras to different target cameras.

Figure 11:
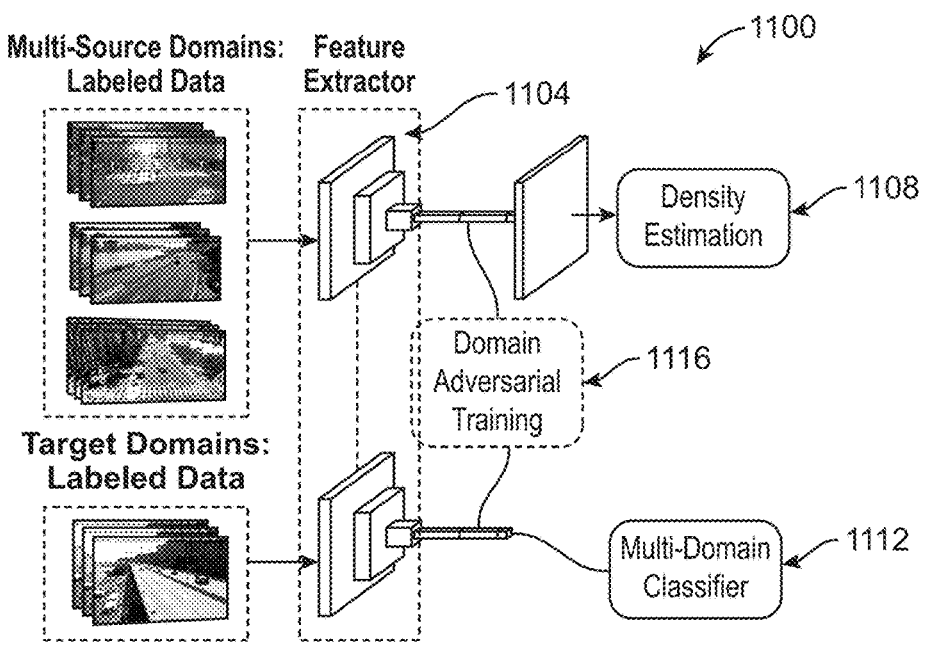
FIG. 11 is a schematic diagram of an example system and method for multi-camera domain adaptation with adversarial learning (MDA) that can be implemented for training an estimating algorithm for use with images of differing backgrounds, lighting, and/or weather conditions.

An MDA methodology learns the features that are discriminative for the main learning task on the source cameras and indiscriminate when shifting between source cameras and target cameras. FIG. 11 illustrates main features of an example MDA system 1100 and methodology. The MDA system includes a deep feature extractor 1104 and a deep label predictor 1108. Unsupervised multi-camera domain adaptation is achieved by adding a multi-domain classifier 1112 connected to feature extractor 1104 via a gradient reversal layer 1116 that multiplies the gradient by a certain negative constant during the backpropagation-based training. Otherwise, the training proceeds standardly and minimizes the label prediction loss (for source examples) and the domain classification loss (for all samples). Gradient reversal ensures that the learned feature distributions are similar over different domains (as indistinguishable as possible for domain classifier 1112), thus resulting in the domain-invariant features.

The MDA methodology can be achieved in almost any feed-forward model by augmenting it with a few standard layers and a new gradient reversal layer. The resulting augmented architecture can be trained using standard backpropagation and stochastic gradient descent, and can thus be easily integrated into, for example, the FCN-MT and the FCN-rLSTM methodologies disclosed herein. As most of the existing domain adaptation work focuses on classification and single source/target domain adaptation for deep neural networks, the proposed MDA methodology may be the first attempt to adapt the fully convolutional networks from multiple source domains to different target domains for the regression task.

The present inventors theoretically analyzed the multi-camera domain adaptation problem and developed an adversarial learning strategy based on the theoretical results. Specifically, new generalization bounds were proved for domain adaptation when there are multiple source domains with labeled instances and one target domain with unlabeled instances. Technically, the bound was derived by first proposing a generalized divergence measure between two sets of distributions from multiple domains. A probably approximately correct (PAC) bound was proved for the target risk by bounding it from empirical source risks using tools from concentration inequalities and the Vapnik-Chervonenkis (VC) theory. Compared with existing bounds, the new bound does not require expert knowledge about the target domain distribution, nor the optimal combination rule for multiple source domains. Results obtained also imply that it is not always beneficial to naively incorporate more source domains into training, which the inventors verified to be true in their experiments.

Figure 12:
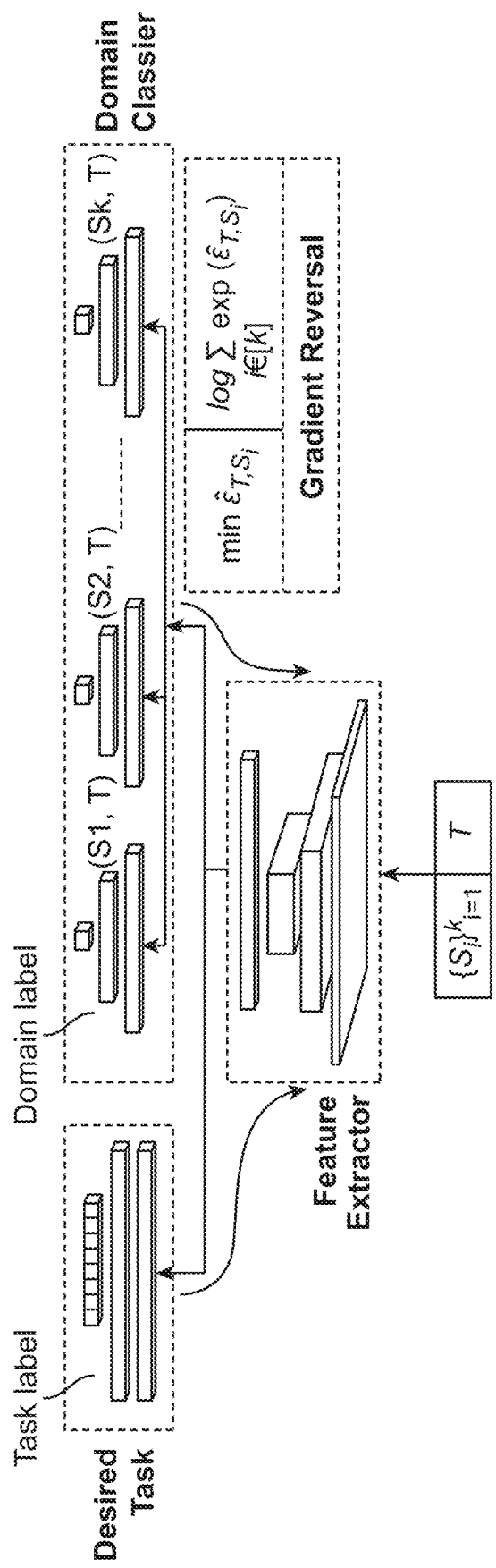
FIG. 12 is a high-level schematic diagram of an example network architecture for implementing an MDA method of the present disclosure, such as the MDA method of FIG. 11.

The bound leads to an efficient implementation for multi-camera domain adaptation using adversarial neural networks (MDA). The MDA methodology uses neural networks as rich function approximators to instantiate the derived generalization bound. After proper transformations, the MDA methodology can be viewed as computationally efficient approximations of the generalization bound, so that the goal is to optimize the parameters of the networks in order to minimize the bound. The present inventors have presently developed two MDA methodologies: a hard version (Hard-Max MDA) that optimizes directly a worst-case generalization bound and a soft version (Soft-Max MDA) that is a smoothed approximation of the hard version, leading to a more data-efficient model and optimizes a task-adaptive bound. The optimization of an MDA methodology of the present disclosure is a minimax saddle-point problem, which can be interpreted as a zero-sum game with two participants competing against each other to learn invariant features. The MDA methodologies combine feature extraction, domain classification, and task learning in one training process. Stochastic optimization with simultaneous updates is used to optimize the parameters in each iteration. An example network architecture for implementing MDA is shown in FIG. 12.

Following is an example mechanism of counting objects, such as vehicles, from multiple cameras using multi-domain adversarial networks. As noted above, the cameras with large amount of training images are regarded as source cameras, while the cameras with no labeled data are regarded as target cameras. The relationship among different source cameras and the target camera was studied, and the source cameras were ranked based on distance from a target camera. The first k cameras were chosen to form the k source domains. Thus the MDA methodologies could be evaluated on differing numbers of sources. Both the Hard-Max and Soft-Max MDA were implemented according to example Algorithm 2, below, based on a basic vehicle counting FCN. Mean absolute error (MAE) between true count and estimated count was recorded. Then, MAE was compared for differing source combinations and the combination with lowest MAE was chosen as the training set for the target camera. In one example, MDA and this source selecting mechanism can be applied for counting vehicles using multiple cameras.

```
Algorithm 2 Multiple Source Domain Adaptation

1: for t = 1 to ∞ do
 2:     Sample {S_i^(t)}_{i=1}^k and T^(t) from {D̂_{S_i}}_{i=1}^k and D̂_T,
        each of size m
 3:     for i = 1 to k do
 4:         ε̂_i^(t) ← ε̂_{S_i}^(t) (h) − min_{h'∈HΔH} ε̂_{T^(t),S_i^(t)}(h')
 5:         Compute w_i^(t) := exp(ε̂_i^(t))
 6:     end for
 7:     # Hard version
 8:     Select i^(t) := arg max_{i∈[k]} ε̂_i^(t)
 9:     Backpropagate gradient of ε̂_{i^(t)}^(t)
10:     # Smoothed version
11:     for i = 1 to k do
12:         Normalize w_i^(t) ← w_i^(t) / Σ_{i'∈[k]} w_{i'}^(t)
13:     end for
14:     Backpropagate gradient of Σ_{i∈[k]} w_i^(t) ε̂_i^(t)
15: end for
```

Example Computing System

It is to be noted that any one or more of the aspects and embodiments of methodologies described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
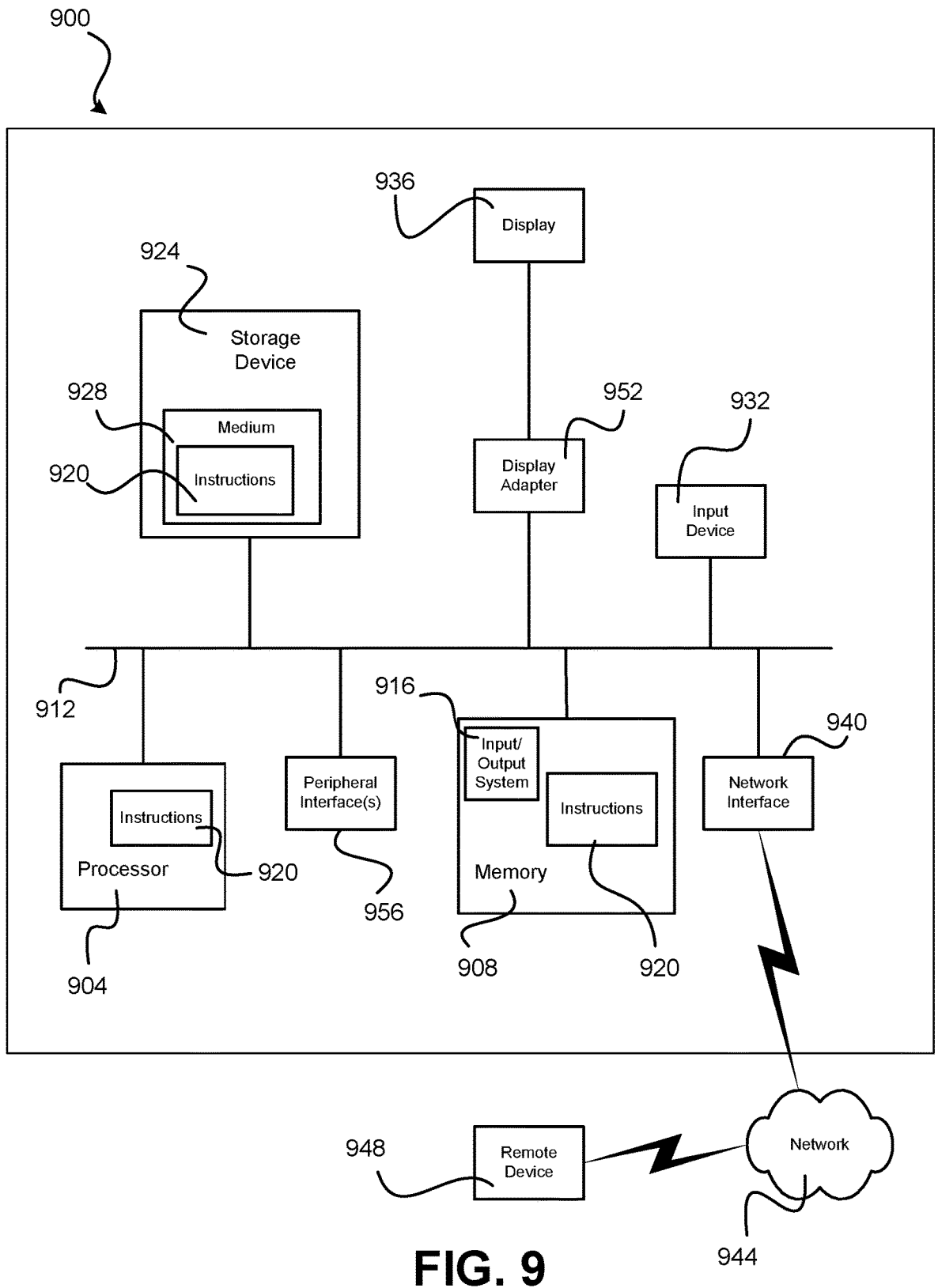
FIG. 9 is a high-level schematic diagram of an example computing system that can be used to implement software for performing any one or more of the methodologies disclosed herein.

FIG. 9 shows a diagrammatic representation of one embodiment of a computing device in the example form of a computer system 900 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of types of software, including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment A(TA), serial ATA, universal serial bus U(SB), IEEE 994 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device (e.g., a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing traffic density and/or traffic flow data to an intelligent traffic system, wherein the traffic density and/or traffic flow data is for a plurality of regions of a roadway network, each region having associated therewith a traffic camera that captures at least one corresponding traffic image of the corresponding region, the method comprising:

automatically estimating, locally to each traffic camera, traffic density and/or traffic flow in the corresponding region of the roadway network using the at least one corresponding traffic image, the estimating for each corresponding region comprising:
training an artificial neural network (ANN)-based density estimation algorithm using training annotated images, wherein the ANN-based density estimation algorithm is configured, when trained, to process one or more input images to automatically determine a traffic density and/or traffic flow for traffic present in the input image(s);
receiving the at least one corresponding traffic image; and
following the training of the ANN-based density estimation algorithm, causing the ANN-based density estimation algorithm to process the at least one corresponding traffic image to determine the traffic density and/or traffic flow for the corresponding region; and transmitting from local to each traffic camera to the intelligent traffic system traffic density and/or traffic flow data corresponding to the traffic density and/or the traffic flow in the corresponding region of the roadway network.

2. The method according to claim 1, further comprising, along with the transmitting of the traffic density and/or traffic flow, transmitting locational information for the corresponding region of the roadway network.

3. The method according to claim 1, wherein each traffic camera has a camera perspective, the method further comprising receiving the training images, wherein the training images having a training perspective substantially the same as the camera perspective of the traffic camera, and each of the training images being a traffic image containing a plurality of vehicle pixel-wise masks, wherein the vehicle pixel-wise masks have been placed in the traffic images from the traffic cameras using a segmentator operating on the traffic images from the traffic camera that have been annotated with the bounding boxes.

4. The method according to claim 3, wherein the annotated real images have be automatically annotated by a detector.

5. The method according to claim 3, further comprising training the segmentator using images rendered from 3D CAD models of differing vehicles of differing types.

6. The method according to claim 1, wherein each traffic camera has a camera perspective, the method further comprising:
    receiving the training images, wherein the training images having a training perspective substantially the same as the camera perspective of the traffic camera, each of the training images being a hybrid image having a realistic background of the region of the roadway and containing a plurality of rendered vehicles of differing types overlaid onto the background, wherein the rendered vehicles:
        are based on 3D CAD models of differing vehicles of differing vehicle types;
        have been placed in the hybrid image using realistic perspectives and realistic occlusions based on the camera perspective; and
        are automatically labeled for categorization based on the 3D CAD models.

7. The method according to claim 1, wherein the ANN-based estimating algorithm is configured to determine traffic flow from a time-sequenced set of traffic images, and the method further comprises providing traffic flow data to the intelligent traffic system, wherein the providing of the traffic flow data includes:
    receiving the time-sequenced set of traffic images;
    causing the ANN-based density estimation algorithm to process the set of traffic images to determine the traffic flow for the set of traffic images; and
    transmitting to the intelligent traffic system traffic flow data corresponding to the traffic flow.

8. The method according to claim 1, wherein the ANN-based estimating algorithm includes a fully convolutional network (FCN).

9. The method according to claim 7, wherein the ANN-based estimating algorithm includes a long short-term memory network (LSTM).

10. The method according to claim 9, wherein the LSTM is directly connected to the FCN.

11. The method according to claim 9, wherein the LSTM is connected to the FCN in a residual learning manner.

12. The method according to claim 11, wherein each traffic camera has a camera perspective, the method further comprising receiving the training images, wherein the training images having a training perspective substantially the same as the camera perspective of the traffic camera, and each of the training images being a traffic image containing a plurality of vehicle pixel-wise masks, wherein the vehicle pixel-wise masks have been placed in the traffic images from the traffic cameras using a segmentator operating on the traffic images from the traffic camera that have been annotated with the bounding boxes.

13. The method according to claim 12, wherein the annotated real images have been automatically annotated by a detector.

14. The method according to claim 12, further comprising training the segmentator using images rendered from 3D CAD models of differing vehicles of differing types.

15. The method according to claim 11, wherein each traffic camera has a camera perspective, the method further comprising:
    receiving the training images, wherein the training images having a training perspective substantially the same as the camera perspective of the traffic camera, each of the training images being a hybrid image having a realistic background of the region of the roadway and containing a plurality of rendered vehicles of differing types overlaid onto the background, wherein the rendered vehicles:
        are based on 3D CAD models of differing vehicles of differing vehicle types;
        have been placed in the hybrid image using realistic perspectives and realistic occlusions based on the camera perspective.

16. The method according to claim 7, wherein the ANN-based algorithm further includes a multi-task network connected to the FCN.

17. A machine-readable storage medium containing machine-executable instructions for performing a method of providing traffic density and/or traffic flow data to an intelligent traffic system, wherein the traffic density and/or traffic flow data is for a plurality of regions of a roadway network, each region having associated therewith a traffic camera that captures at least one corresponding traffic image of the corresponding region, the method comprising:
    automatically estimating, locally to each traffic camera, traffic density and/or traffic flow in the corresponding region of the roadway network using the at least one corresponding traffic image, the estimating for each corresponding region comprising:
        training an artificial neural network (ANN)-based density estimation algorithm using training annotated images, wherein the ANN-based density estimation algorithm is configured, when trained, to process one or more input images to automatically determine a traffic density and/or traffic flow for traffic present in the input image(s);
        receiving the at least one corresponding traffic image; and
        following the training of the ANN-based density estimation algorithm, causing the ANN-based density estimation algorithm to process the at least one corresponding traffic image to determine the traffic density and/or traffic flow for the corresponding region; and
    transmitting from local to each traffic camera to the intelligent traffic system traffic density and/or traffic flow data corresponding to the traffic density and/or the traffic flow in the corresponding region of the roadway network.

18. The machine-readable storage medium of claim 17, wherein the method further comprises, along with the transmitting of the traffic density and/or traffic flow, transmitting locational information for the corresponding region of the roadway network.

19. The machine-readable storage medium of claim 17, wherein each traffic camera has a camera perspective and the method further comprises receiving the training images, wherein the training images having a training perspective substantially the same as the camera perspective of the traffic camera, and each of the training images being a traffic image containing a plurality of vehicle pixel-wise masks, wherein the vehicle pixel-wise masks have been placed in the traffic images from the traffic cameras using a segmentator operating on the traffic images from the traffic camera that have been annotated with the bounding boxes.

20. The machine-readable storage medium of claim 19, wherein the annotated real images have be automatically annotated by a detector.

21. The machine-readable storage medium of claim 19, where the method further comprises training the segmentator using images rendered from 3D CAD models of differing vehicles of differing types.

22. The machine-readable storage medium of claim 17, wherein each traffic camera has a camera perspective and the method further comprises:
  receiving the training images, wherein the training images having a training perspective substantially the same as the camera perspective of the traffic camera, each of the training images being a hybrid image having a realistic background of the region of the roadway and containing a plurality of rendered vehicles of differing types overlaid onto the background, wherein the rendered vehicles:
    are based on 3D CAD models of differing vehicles of differing vehicle types;
    have been placed in the hybrid image using realistic perspectives and realistic occlusions based on the camera perspective; and
    are automatically labeled for categorization based on the 3D CAD models.

23. The machine-readable storage medium of claim 17, wherein the ANN-based estimating algorithm is configured to determine traffic flow from a time-sequenced set of traffic images, and the method further comprises providing traffic flow data to the intelligent traffic system, wherein the providing of the traffic flow data includes:
  receiving the time-sequenced set of traffic images;
  causing the ANN-based density estimation algorithm to process the set of traffic images to determine the traffic flow for the set of traffic images; and
  transmitting to the intelligent traffic system traffic flow data corresponding to the traffic flow.

24. The machine-readable storage medium of claim 17, wherein the ANN-based estimating algorithm includes a fully convolutional network (FCN).

25. The machine-readable storage medium of claim 23, wherein the ANN-based estimating algorithm includes a long short-term memory network (LSTM).

26. The machine-readable storage medium of claim 25, wherein the LSTM is directly connected to the FCN.

27. The machine-readable storage medium of claim 25, wherein the LSTM is connected to the FCN in a residual learning manner.

28. The machine-readable storage medium of claim 27, wherein each traffic camera has a camera perspective, the method further comprising receiving the training images, wherein the training images having a training perspective substantially the same as the camera perspective of the traffic camera, and each of the training images being a traffic image containing a plurality of vehicle pixel-wise masks, wherein the vehicle pixel-wise masks have been placed in the traffic images from the traffic cameras using a segmentator operating on the traffic images from the traffic camera that have been annotated with the bounding boxes.

29. The machine-readable storage medium of claim 28, wherein the annotated real images have been automatically annotated by a detector.

30. The machine-readable storage medium of claim 28, wherein the method further comprises training the segmentator using images rendered from 3D CAD models of differing vehicles of differing types.

31. The machine-readable storage medium of claim 27, wherein each traffic camera has a camera perspective, the method further comprising:
  receiving the training images, wherein the training images having a training perspective substantially the same as the camera perspective of the traffic camera, each of the training images being a hybrid image having a realistic background of the region of the roadway and containing a plurality of rendered vehicles of differing types overlaid onto the background, wherein the rendered vehicles:
    are based on 3D CAD models of differing vehicles of differing vehicle types;
    have been placed in the hybrid image using realistic perspectives and realistic occlusions based on the camera perspective.

32. The machine-readable storage medium of claim 23, wherein the ANN-based algorithm further includes a multi-task network connected to the FCN.

* * * * *